(12) United States Patent
Kim et al.

(10) Patent No.: US 12,547,283 B2
(45) Date of Patent: Feb. 10, 2026

(54) INPUT SENSOR AND DISPLAY DEVICE INCLUDING THE SAME

(71) Applicant: Samsung Display Co., Ltd., Yongin-Si (KR)

(72) Inventors: Eun Young Kim, Yongin-si (KR); Hye Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/780,480

(22) Filed: Jul. 23, 2024

(65) Prior Publication Data
US 2025/0044903 A1    Feb. 6, 2025

(30) Foreign Application Priority Data

Jul. 31, 2023   (KR) .................. 10-2023-0100082

(51) Int. Cl.
*G06F 3/044*     (2006.01)
(52) U.S. Cl.
CPC .......... *G06F 3/0445* (2019.05); *G06F 3/0446* (2019.05); *G06F 2203/04111* (2013.01); *G06F 2203/04112* (2013.01)
(58) Field of Classification Search
CPC ............... G06F 3/0445; G06F 3/0446; G06F 2203/04111; G06F 2203/04112; G06F 3/0412; G06F 3/04164; G06F 3/0443; G06F 3/04845; G06F 3/0416; G06F 3/04847; G06F 3/04886; G06F 3/047
See application file for complete search history.

(56) References Cited

U.S. PATENT DOCUMENTS

| | | | |
|---|---|---|---|
| 11,133,355 B2 | 9/2021 | Park et al. | |
| 11,385,751 B2 | 7/2022 | Bang et al. | |
| 11,500,503 B1* | 11/2022 | Chen | G06F 3/0443 |
| 2014/0184949 A1* | 7/2014 | Yim | G06F 3/041 349/12 |
| 2016/0291780 A1* | 10/2016 | Namkung | G06F 3/0412 |
| 2017/0364175 A1* | 12/2017 | Park | H05K 7/2039 |
| 2019/0189699 A1* | 6/2019 | Ye | H10K 50/844 |
| 2020/0210012 A1* | 7/2020 | Kim | H10K 59/131 |
| 2020/0357857 A1* | 11/2020 | Park | G06F 3/0445 |

FOREIGN PATENT DOCUMENTS

| | | |
|---|---|---|
| KR | 10-2020-0130578 A | 11/2020 |
| KR | 10-2021-0056468 A | 5/2021 |

* cited by examiner

*Primary Examiner* — Md Saiful A Siddiqui
(74) *Attorney, Agent, or Firm* — Innovation Counsel LLP

(57) ABSTRACT

A display device includes a display panel. An input sensor is disposed on the display panel. A first pattern of the input sensor includes mesh lines. A second pattern of the input sensor overlaps the first pattern with an insulating layer interposed therebetween, and includes mesh lines. The mesh lines of the first pattern include a first mesh line extending in the first reference direction, and the mesh lines of the second pattern include a second mesh line extending in the first reference direction and overlapping the first mesh line in a plan view. In a plan view, first cutting areas in which the first mesh line is partially cut and second cutting areas in which the second mesh line is partially cut do not overlap.

17 Claims, 24 Drawing Sheets

CPL1: MSL1, MSL3
CPL2: MSL2, MSL4

INPUT SENSOR AND DISPLAY DEVICE INCLUDING THE SAME

This application claims priority to Korean Patent Application No. 10-2023-0100082, filed on Jul. 31, 2023, and all the benefits accruing therefrom under 35 U.S.C. § 119, the content of which in its entirety is herein incorporated by reference.

BACKGROUND

1. Field

The disclosure relates to an input sensor and a display device.

2. Description of the Related Art

A display device may include a display panel displaying an image and an input sensor sensing an external input. The input sensor may be integrally formed with the display panel through a successive process. Alternatively, the input sensor may be formed through a process separated from the display panel and then coupled to the display panel.

SUMMARY

An object of the disclosure is to provide an input sensor and a display device in which a sensor pattern is not visually recognized.

According to embodiments of the disclosure, a display device includes a display panel including a display area where an image is displayed, and an input sensor disposed on the display panel. The input sensor includes a first pattern including mesh lines in the display area, and a second pattern overlapping the first pattern with an insulating layer interposed therebetween and including mesh lines. The mesh lines of the first pattern include a first mesh line extending in a first reference direction, and the mesh lines of the second pattern include a second mesh line extending in the first reference direction and overlapping the first mesh line in a plan view. In a plan view, first cutting areas in which the first mesh line is partially cut and second cutting areas in which the second mesh line is partially cut do not overlap each other.

In a plan view, the first cutting areas of the first mesh line may be spaced apart from the second cutting areas of the second mesh line by a distance greater than a width of the first and second cutting areas.

In a plan view, the first cutting areas of the first mesh line may be spaced apart from the second cutting areas of the second mesh line by a distance of about 2 μm or more.

In a plan view, the first cutting areas of the first mesh line may be positioned along first cutting lines, the second cutting areas of the second mesh line may be positioned along second cutting lines, and the first cutting lines and the second cutting lines extending along a same direction may not overlap each other.

A line width of the first mesh line and a line width of the second mesh line may be substantially the same.

A line width of the second mesh line may be greater than a line width of the first mesh line, and in a plan view, the second mesh line may substantially cover the first mesh line.

The input sensor may further include a first sensor electrode, and a second sensor electrode insulated from the first sensor electrode and crossing the first sensor electrode, the first sensor electrode may include the first pattern and the second pattern, and the second pattern may be connected to the first pattern through a contact hole formed through the insulating layer.

In a plan view, at least a portion of the first cutting areas and the second cutting areas may be positioned at an edge of the first sensor electrode.

In a plan view, the first cutting areas and the second cutting areas may be positioned inside the first sensor electrode and spaced apart from a boundary between the first sensor electrode and the second sensor electrode.

The second sensor electrode may include a third pattern including mesh lines, disposed in the same layer as the first pattern, and spaced apart from the first pattern, and a fourth pattern disposed in the same layer as the second pattern, spaced apart from the second pattern, overlapping the third pattern, connected to the third pattern through a contact hole formed through the insulating layer, and including mesh lines.

The first pattern may include first sensor areas and a first bridge area connecting the first sensor areas, the second pattern may include second sensor areas overlapping the first sensor areas, the third pattern may include third sensor areas and a dummy area spaced apart from the third sensor areas, the fourth pattern may include fourth sensor areas overlapping the third sensor areas and the first bridge area and a second bridge area connecting the fourth sensor areas and overlapping the dummy area, a direction in which the first sensor areas are arranged and a direction in which the second sensor areas are arranged may be the same, a direction in which the third sensor areas are arranged and a direction in which the fourth sensor areas are arranged may be the same, and a direction in which the first sensor areas are arranged and a direction in which the third sensor areas are arranged may cross each other.

The input sensor may be directly disposed on the display panel.

The input sensor may further include a sensor electrode including the second pattern, and a sensing line including the first pattern and electrically connected to the sensor electrode.

The input sensor may further include a dummy line disposed in the same layer as the sensing line and including a mesh line overlapping the sensor electrode in a plan view, and in a plan view, third cutting areas in which the mesh line of the dummy line is partially cut may not overlap the second cutting areas.

The input sensor may further include a sensor electrode including the second pattern, a dummy electrode including the first pattern, and a sensing line disposed in the same layer as the dummy electrode, including mesh lines overlapping the sensor electrode in a plan view, and electrically connected to the sensor electrode.

The mesh lines of the sensing line may not include a cutting area therein.

According to embodiments of the disclosure, an input sensor includes a first pattern including mesh lines and disposed in a sensor area, and a second pattern overlapping the first pattern with an insulating layer interposed therebetween and including mesh lines. The mesh lines of the first pattern include a first mesh line extending in a first reference direction, and the mesh lines of the second pattern include a second mesh line extending in the first reference direction and overlapping the first mesh line. In a plan view, first cutting areas in which the first mesh line is partially cut and second cutting areas in which the second mesh line is partially cut do not overlap each other.

A line width of the second mesh line may be greater than a line width of the first mesh line, and in a plan view, the second mesh line may substantially cover the first mesh line.

The input sensor may further include a first sensor electrode, and a second sensor electrode insulated from the first sensor electrode and crossing the first sensor electrode, the first sensor electrode may include the first pattern and the second pattern, and the second pattern may be connected to the first pattern through a contact hole formed through the insulating layer.

The input sensor may further include a sensor electrode including the second pattern, and a sensing line including the first pattern and electrically connected to the sensor electrode.

In the input sensor and the display device according to embodiments of the disclosure, a sensor pattern may have a two-layer structure including the first pattern and the second pattern that substantially overlap each other, and the first cutting area of the mesh line of the first pattern and the second cutting area of the mesh line of the second pattern may not overlap each other. Therefore, a difference between a light amount in each of the first and second cutting areas and a light amount in remaining areas (that is, a light reflected by the mesh line) may be minimized, and the sensor pattern may not be visually recognized.

In addition, the line width of the mesh line of the second pattern may be greater than the line width of the mesh line of the first pattern, and the second pattern may cover the first pattern in a plan view. Therefore, light may be reflected by the second pattern in an area other than the second cutting area, light may be reflected by the first pattern in the second cutting area, a light amount (that is, a light amount reflected by the mesh line) becomes identical or similar throughout the input sensor and display device, and the sensor pattern may not be visually recognized.

Furthermore, the sensing line disposed in the sensor area and overlapping the sensor pattern may include the dummy cutting area corresponding to the second cutting area of the mesh line of the sensor pattern, and the dummy cutting area may not overlap the second cutting area. Therefore, the sensing line may also not be visually recognized.

An effect according to embodiments is not limited by the content exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
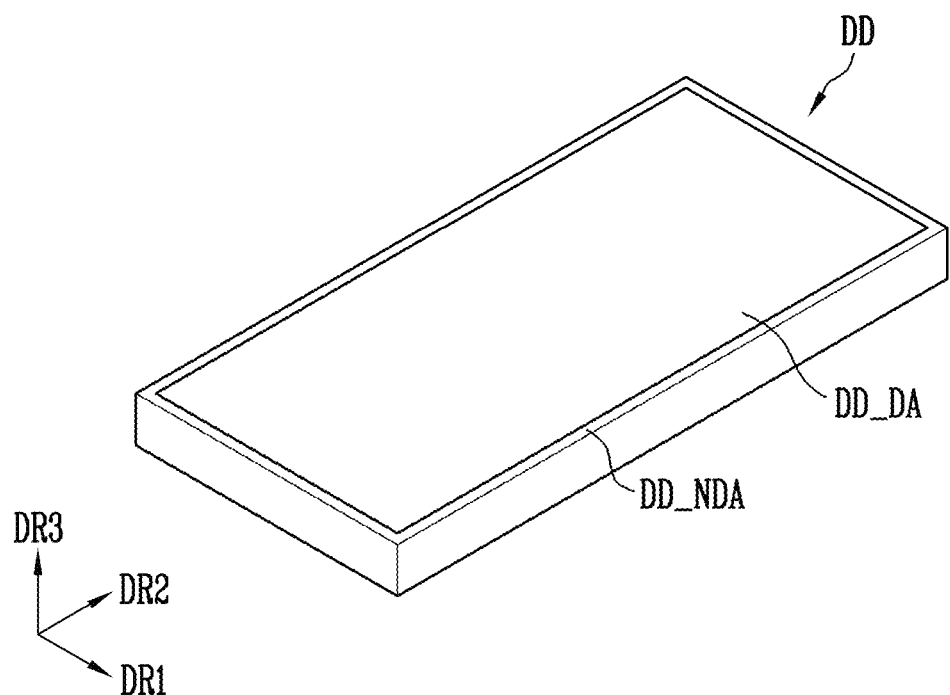
FIG. 1 is a perspective view schematically illustrating a display device according to embodiments of the disclosure.

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance. In addition, a case where a portion of a layer, a layer, an area, a plate, or the like is referred to as being "on" another portion, it includes not only a case where the portion is "directly on" another portion, but also a case where there is further another portion between the portion and another portion. In addition, in the present specification, when a portion of a layer, a layer, an area, a plate, or the like is formed on another portion, a forming direction is not limited to an upper direction but includes forming the portion on a side surface or in a lower direction. On the contrary, when a portion of a layer, a layer, an area, a plate, or the like is formed "under" another portion, this includes not only a case where the portion is "directly beneath" another portion but also a case where there is further another portion between the portion and another portion.

In the following description, a case where a portion is connected to another portion includes a case where they are electrically connected to each other with another element interposed therebetween as well as a case in which they are directly connected to each other. In an embodiment of the disclosure, a term "connection" between two configurations may mean that both of an electrical connection and a physical connection are inclusively used.

Hereinafter, a display device according to embodiments is described with reference to drawings.

Figure 2:
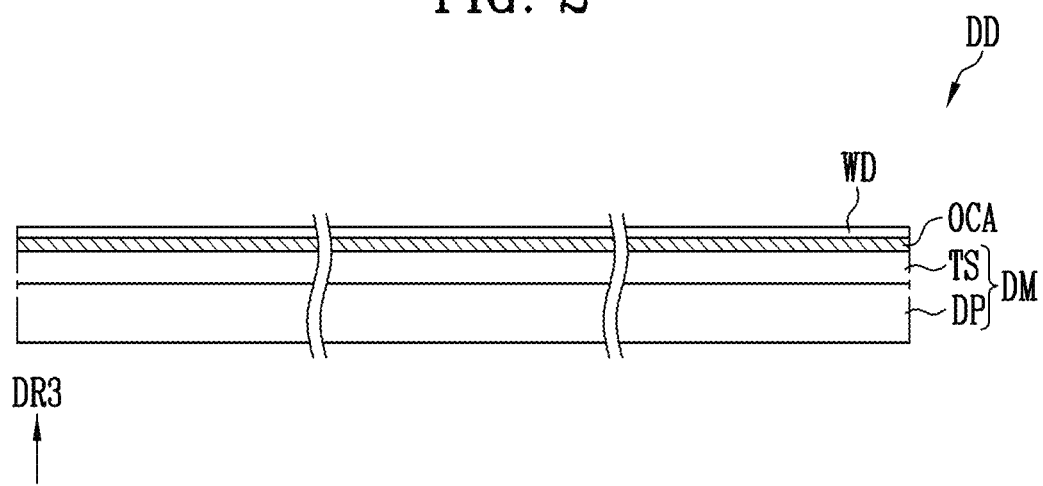
FIG. 2 is a schematic cross-sectional view of the display device of FIG. 1.
Figure 3:
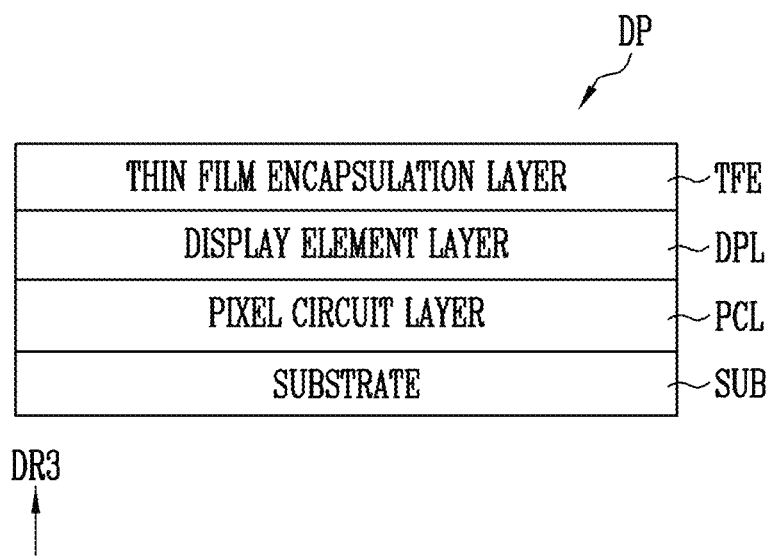
FIG. 3 is a schematic cross-sectional view of a display panel in the display device of FIG. 2.
Figure 4:
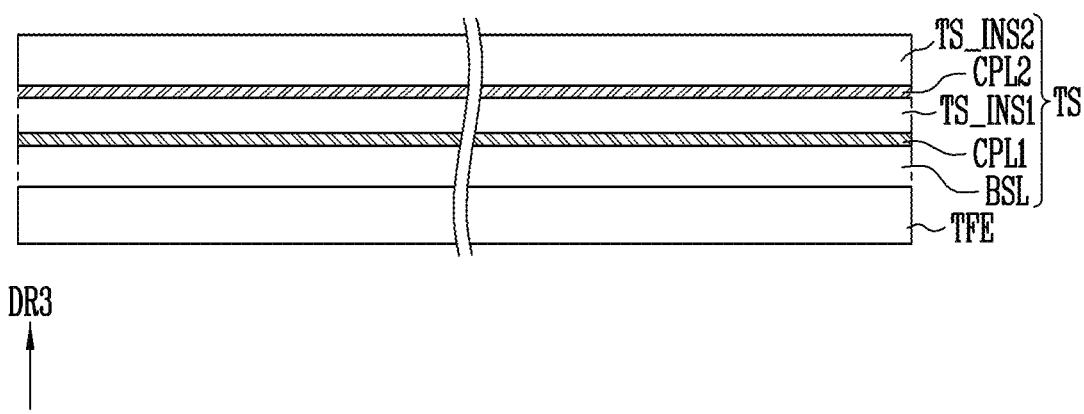
FIG. 4 is a schematic cross-sectional view of a touch sensor in the display device of FIG. 2.

FIG. 1 is a perspective view schematically illustrating a display device according to embodiments of the disclosure. FIG. 2 is a schematic cross-sectional view of the display device of FIG. 1. FIG. 3 is a schematic cross-sectional view of a display panel in the display device of FIG. 2. FIG. 4 is a schematic cross-sectional view of a touch sensor in the display device of FIG. 2.

Referring to FIGS. 1 to 4, when the display device DD is an electronic device which includes a display surface such as a smartphone, a television, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable, the disclosure may be applied to the display device DD.

The display device DD may have various shapes, and for example, the display device DD may have a rectangular plate shape having two pairs of sides parallel to each other, but the disclosure is not limited thereto. When the display device DD has the rectangular plate shape, one pair of sides of the two pairs of sides may be longer than the other pair of sides. In the drawing, the display device DD has an angled corner portion formed of a straight line, but the disclosure is not limited thereto. According to an embodiment, the display device DD having the rectangular plate shape may have a round corner portion where one long side and one short side contact each other.

In an embodiment of the disclosure, for convenience of description, the display device DD has the rectangular shape having a pair of long sides and a pair of short sides, and an extension direction of the long side is indicated as a second direction DR2, an extension direction of the short side is indicated as a first direction DR1, and a direction perpendicular to the extension directions of the long side and the short side is indicated as a third direction DR3. The first to third directions DR1, DR2, and DR3 may refer to directions indicated by the first to third directions DR1, DR2, and DR3, respectively.

In an embodiment of the disclosure, at least a portion of the display device DD may have flexibility, and the display device DD may be folded at a portion having flexibility.

The display device DD may include a display area DD_DA displaying an image and a non-display area DD_NDA provided on at least one side of the display area DD_DA. The non-display area DD_NDA is an area in which an image is not displayed. However, the disclosure is not limited thereto. According to an embodiment, a shape of the display area DD_DA and a shape of the non-display area DD_NDA may be relatively designed.

According to an embodiment, the display device DD may include a sensing area and a non-sensing area. The display device DD may not only display an image through the sensing area, but also sense a touch input performed on a display surface or sense light incident from a front direction. The non-sensing area may surround the sensing area, but this is an example and may not be limited thereto. According to an embodiment, a partial area of the display area DA may correspond to the sensing area.

The display device DD may include a display module DM and a window WD. The display module DM may include a display panel DP and a touch sensor TS.

The display panel DP may display an image through the display area DD_DA. As the display panel DP, a display panel capable of self-emission, such as an organic light emitting display panel (OLED panel) using an organic light emitting diode as a light emitting element, an ultra-small light emitting diode display panel (nano-scale LED display panel) using an ultra-small light emitting diode as a light emitting element, and a quantum dot organic light emitting display panel (QD OLED panel) using a quantum dot and an organic light emitting diode may be used. In addition, as the display panel DP, a non-emission display panel such as a liquid crystal display panel (LCD panel), an electro-phoretic display panel (EPD panel), and an electro-wetting display panel (EWD panel) may be used. When the non-emission display panel is used as the display panel DP, the display device DD may include a backlight unit that supplies light to the display panel DP.

The display panel DP may include a substrate SUB, a pixel circuit layer PCL, a display element layer DPL, and a thin film encapsulation layer TFE.

The substrate SUB may be a rigid substrate or a flexible substrate. Here, when the substrate SUB is the rigid substrate, the substrate SUB may be one of a glass substrate, a quartz substrate, a glass ceramic substrate, and a crystalline glass substrate. When the substrate SUB is the flexible substrate, the substrate SUB may be one of a film substrate and a plastic substrate including a polymer organic material. In addition, the substrate SUB may include fiber glass reinforced plastic (FRP).

The pixel circuit layer PCL may be disposed on the substrate SUB. In the pixel circuit layer PCL, a plurality of thin film transistors and signal lines connected to the thin film transistors may be disposed. For example, each thin film transistor may have a shape in which a semiconductor layer, a gate electrode, and a source/drain electrode are sequentially stacked with an insulating layer interposed therebetween. The semiconductor layer may include amorphous silicon, poly silicon, low temperature poly silicon, and an organic semiconductor. The gate electrode and the source/drain electrode may include one of aluminum (Al), copper (Cu), titanium (Ti), and molybdenum (Mo), but the disclosure is not limited thereto. In addition, the pixel circuit layer PCL may include one or more insulating layers.

The display element layer DPL may be disposed on the pixel circuit layer PCL. The display element layer DPL may include a light emitting element emitting light. The light emitting element may be, for example, an organic light emitting diode, but the disclosure is not limited thereto. According to an embodiment, the light emitting element may be an inorganic light emitting element including an inorganic light emitting material or a light emitting element (a quantum dot display element) that emits light by changing a wavelength of light emitted using a quantum dot. The organic light emitting diode may have, for example, a shape in which an anode electrode, a hole transport layer, an organic light emitting layer, an electron transport layer, and a cathode electrode are sequentially stacked, but is not limited thereto.

The thin film encapsulation layer TFE may be disposed on the display element layer DPL. The thin film encapsulation layer TFE may be an encapsulation substrate or may have a shape of an encapsulation layer formed of multiple layers.

When the thin film encapsulation layer TFE has the shape of the encapsulation layer, the thin film encapsulation layer TFE may include an inorganic layer and/or an organic layer. For example, the thin film encapsulation layer TFE may have a shape in which an inorganic layer, an organic layer, and an inorganic layer are sequentially stacked. The thin film encapsulation layer TFE may prevent external air and moisture from penetrating into the display element layer DPL and the pixel circuit layer PCL.

The touch sensor TS (an input sensor, or an input sensing device) may be directly formed on a surface on which an image of the display panel DP is emitted to receive a user's touch input and/or a hover input. Here, "directly formed" may mean that the touch sensor is formed by a successive process and is attached to the surface on which the image of the display panel DP is emitted without a separate adhesive layer. The touch sensor TS may sense a touch capacitance when input means such as a user's hand or a conductor contact and/or approach close to the touch sensor to recognize the touch input and/or the hover input of the display device DD. Here, the touch input may mean a direct touch (or contact) by the user's hand or the separate input means, and the hover input may mean that the user's hand or the separate input means is near the display device DD including the touch sensor TS but does not touch the display device DD.

The touch sensor TS may have a multiple layer structure. The touch sensor TS may include at least one or more conductive layers and may include at least one or more insulating layers.

The touch sensor TS may include a base layer BSL, a first conductive layer CPL1, a first insulating layer TS_INS1, a second conductive layer CPL2, and a second insulating layer TS_INS2.

The first conductive layer CPL1 may be directly disposed on the thin film encapsulation layer TFE of the display panel DP, but the disclosure is not limited thereto. According to an embodiment, another insulating layer, for example, the base layer BSL, may be disposed between the first conductive layer CPL1 and the thin film encapsulation layer TFE. In this case, the first conductive layer CPL1 may be directly disposed on the base layer BSL.

Each of the first and second conductive patterns CP1 and CP2 may have a single layer structure or may have a multiple layer structure stacked in a thickness direction, for example, the third direction DR3. The conductive layer of the single layer structure may include a conductive material. For example, the conductive material may include a metal such as molybdenum (Mo), silver (Ag), titanium (Ti), copper (Cu), aluminum (Al), and an alloy thereof, or may include transparent conductive oxide such as indium tin oxide (ITO), indium zinc oxide (IZO), zinc oxide (ZnO), or indium tin zinc oxide (ITZO).

The conductive layer of the multiple layer structure may include metal layers of multiple layers. The metal layers of multiple layers may have, for example, a triple structure of titanium (Ti)/aluminum (Al)/titanium (Ti), but are not limited thereto. The conductive layer of the multiple layer structure may include metal layers of multiple layers and a transparent conductive layer.

Figure 5:
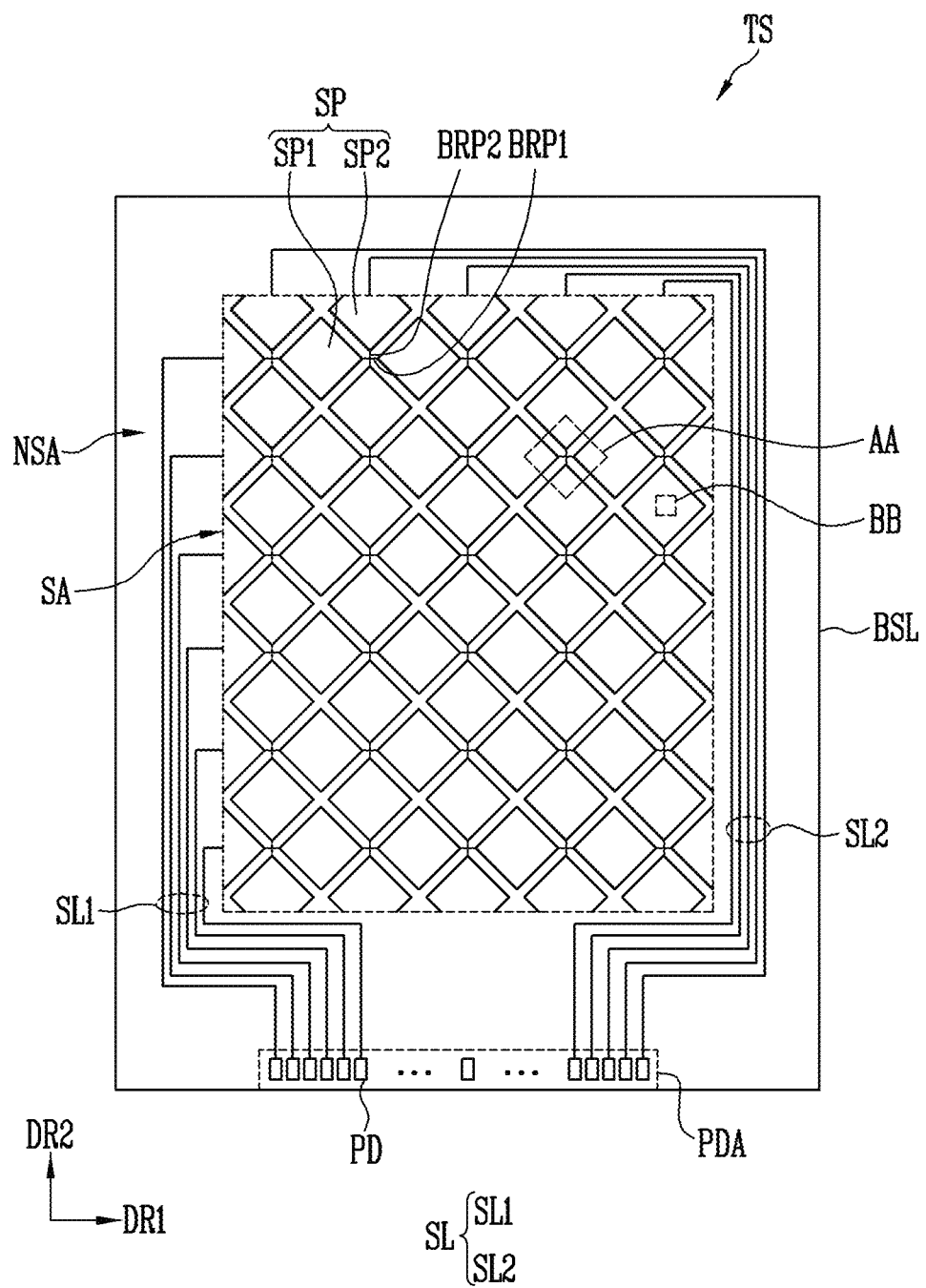
FIG. 5 is a plan view schematically illustrating an embodiment of the touch sensor of FIG. 4.

In an embodiment of the disclosure, each of the first and second conductive layers CPL1 and CPL2 may include sensor patterns SP (refer to FIG. 5) and sensing lines SL (refer to FIG. 5).

Each of the first and second insulating layers TS_INS1 and TS_INS2 may include an inorganic material or an organic material. The inorganic material may include at least one of an inorganic insulating layer such as silicon nitride ($SiN_x$), silicon oxide ($SiO_x$), silicon oxynitride (SiON), and aluminum oxide ($AlO_x$). The organic material may include at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin.

The window WD for protecting an exposed surface of a display module DM may be provided on the display module DM. The window WD may protect the display module DM from external impact and provide an input surface and/or a display surface to the user. The window WD may be coupled to the display module DM using an optically transparent adhesive OCA.

The window WD may have a multilayer structure selected from a glass substrate, a plastic film, and a plastic substrate. Such a multilayer structure may be formed through a successive process or an adhesion process using an adhesive layer. The entire or a portion of the window WD may have flexibility.

Figure 6:
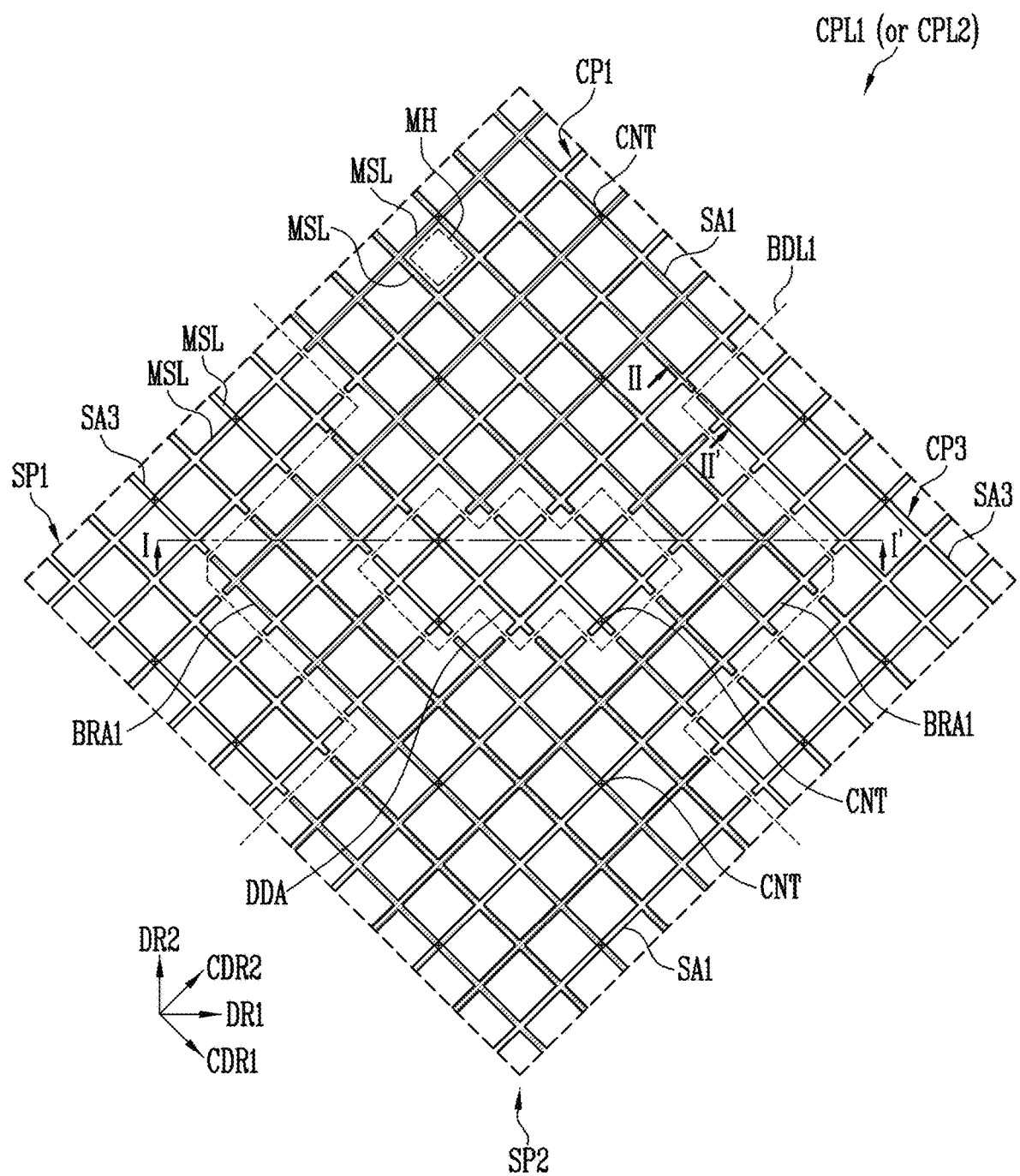
FIGS. 6 and 7 are enlarged plan views of an AA area of FIG. 5.
Figure 7:
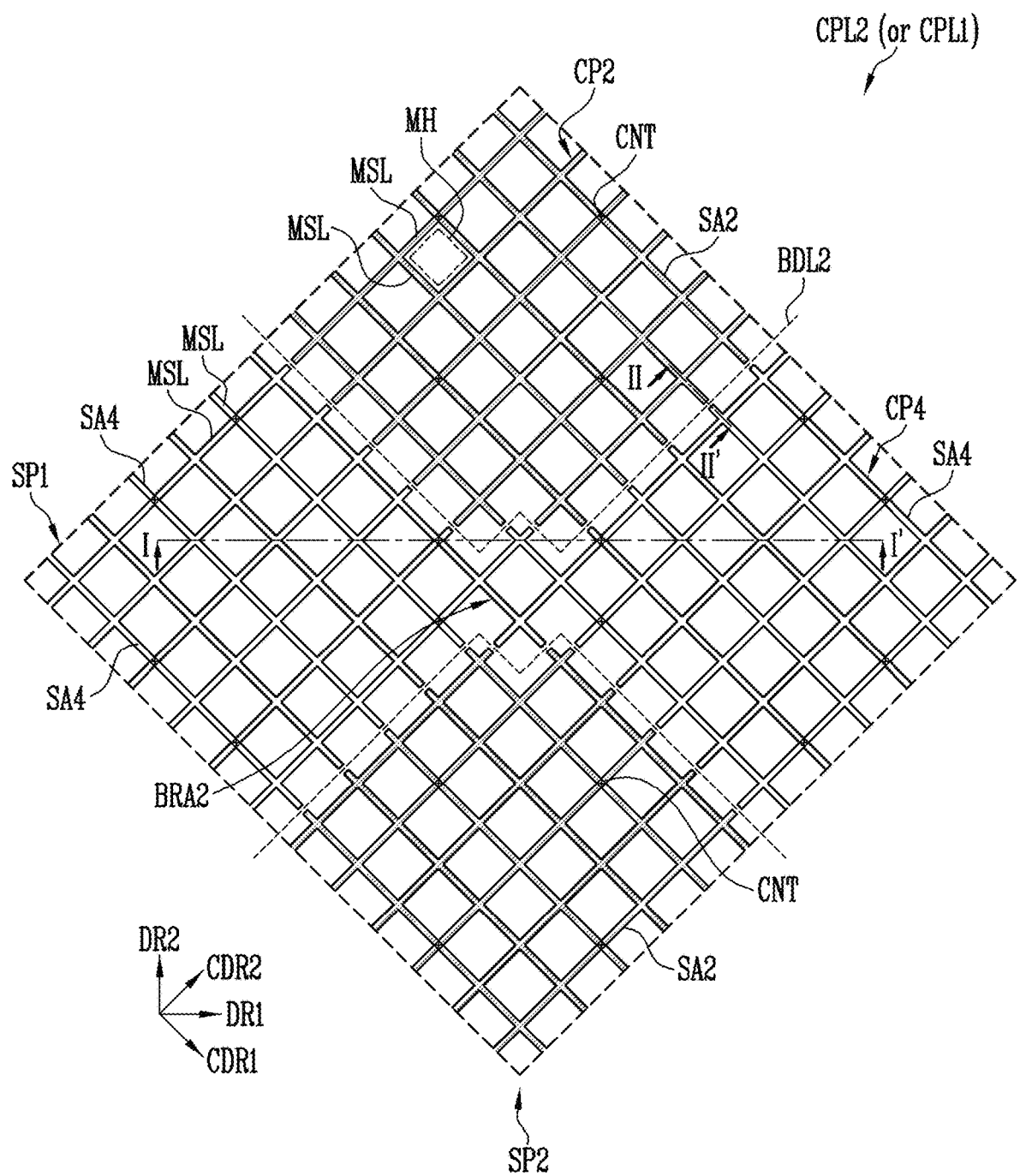
Figure 8:
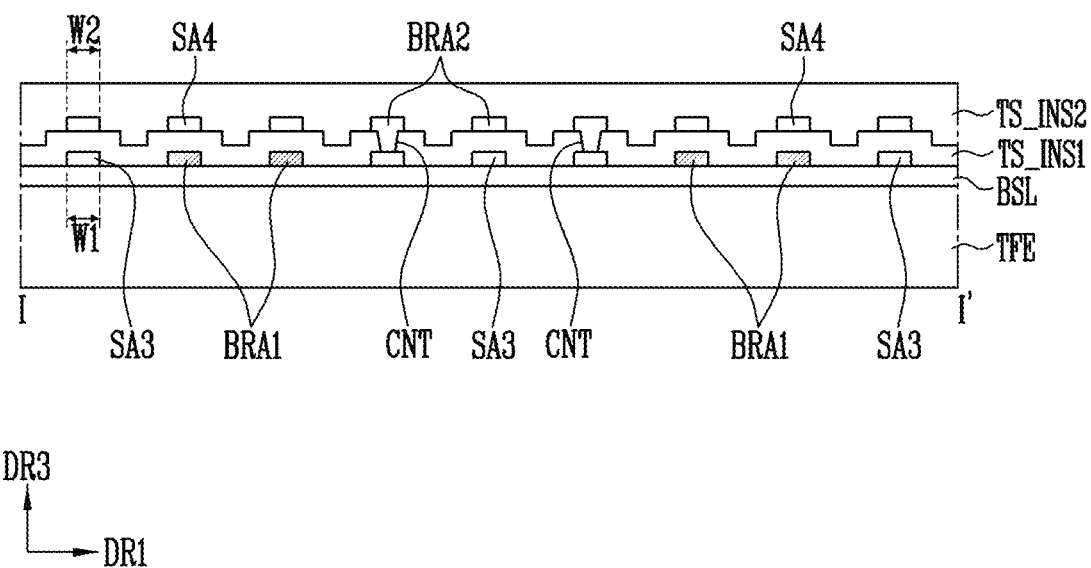
FIG. 8 is a cross-sectional view taken along a line I-I' of FIGS. 6 and 7.
Figure 9:
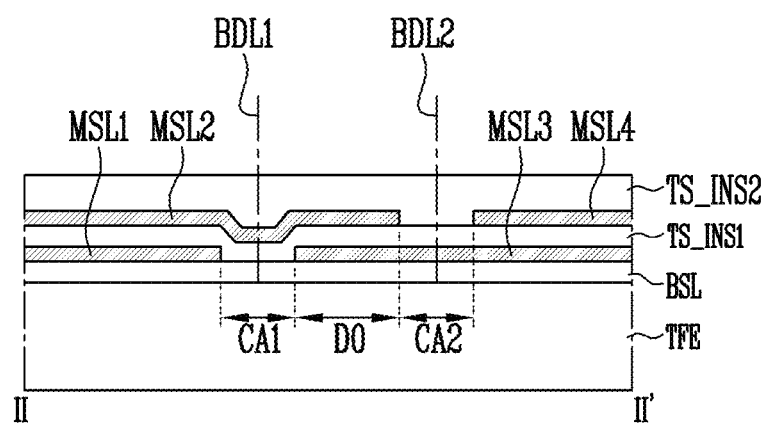
FIG. 9 is a cross-sectional view taken along a line II-II' of FIGS. 6 and 7.
Figure 9:
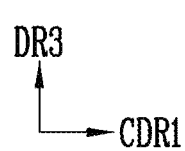
Figure 10:
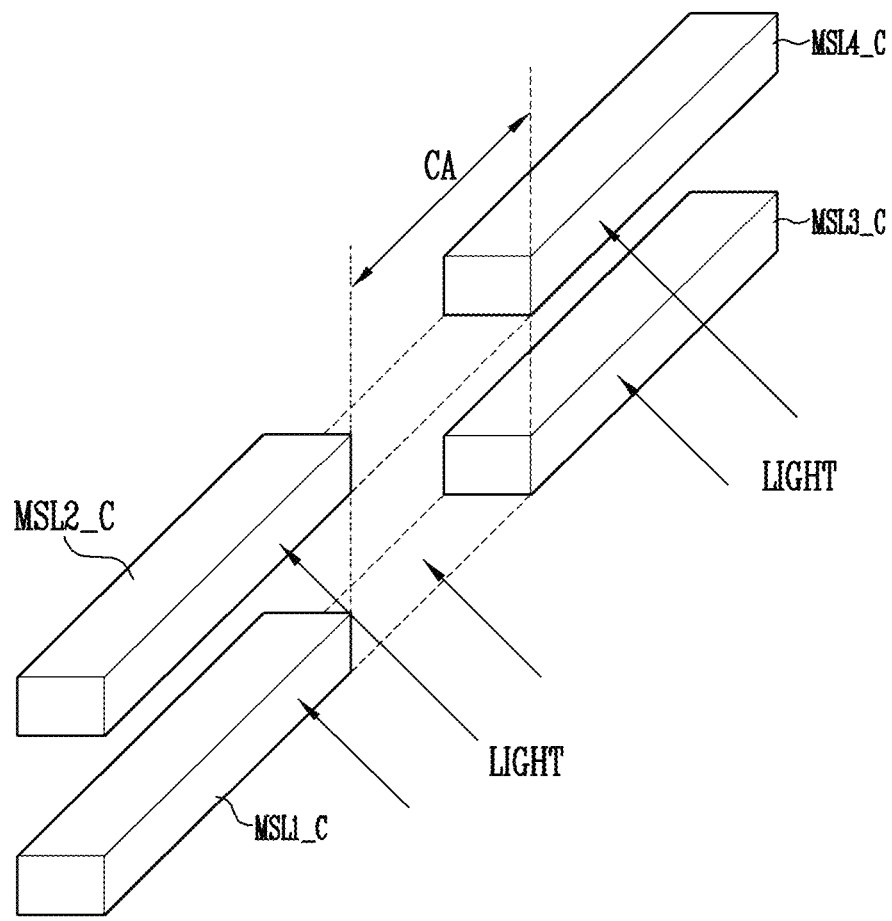
FIG. 10 is a diagram illustrating an optical characteristic of the touch sensor.
Figure 11:
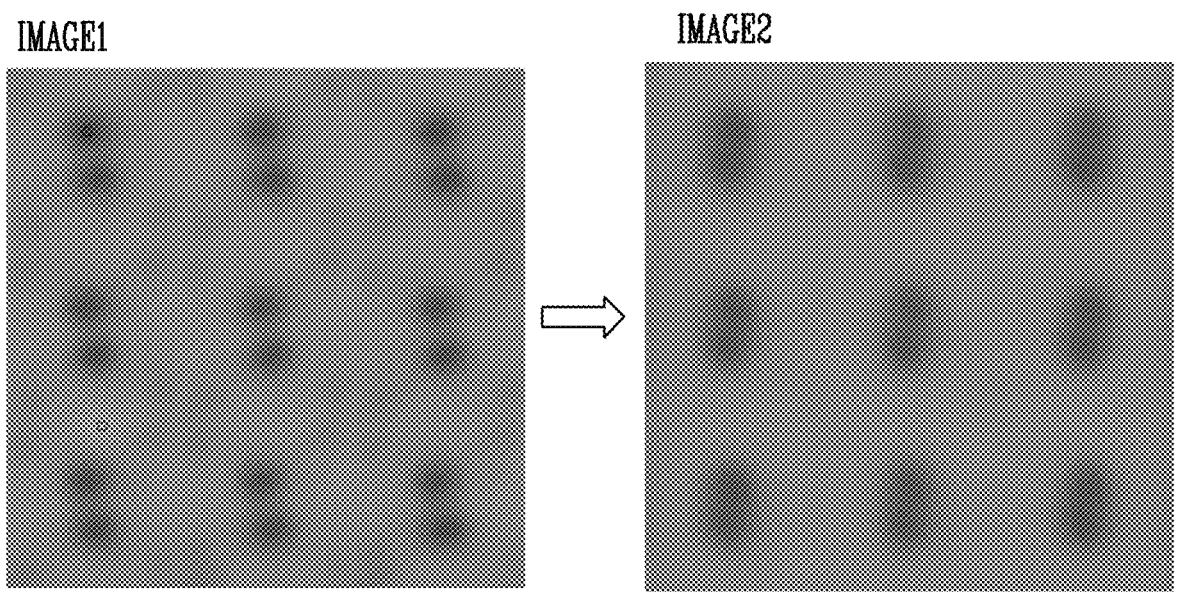
FIG. 11 is a diagram illustrating an image obtained by capturing the touch sensor.

FIG. 5 is a plan view schematically illustrating an embodiment of the touch sensor of FIG. 4. FIGS. 6 and 7 are enlarged plan views of an AA area of FIG. 5. FIG. 8 is a cross-sectional view taken along a line I-I' of FIGS. 6 and 7. FIG. 9 is a cross-sectional view taken along a line II-II' of FIGS. 6 and 7. FIG. 10 is a diagram illustrating an optical characteristic of the touch sensor. FIG. 11 is a diagram illustrating an image obtained by capturing the touch sensor.

Referring to FIGS. 1, 4, and 5, the touch sensor TS (or the base layer BSL) may include a sensor area SA (a sensing area, or an active area) capable of sensing a touch input and a non-sensor area NSA (or a non-sensing area) surrounding at least a portion of the sensor area SA and not capable of sensing the touch input.

The base layer BSL may be formed of tempered glass, transparent plastic, or a transparent film. According to an embodiment, the base layer BSL may be omitted.

The sensor area SA may be provided in a central portion of the base layer BSL to overlap the display area DD_DA (refer to FIG. 1). The sensor area SA may be provided in substantially the same shape as a shape of the display area DD_DA, but is not limited thereto. A sensor electrode for sensing the touch input may be provided and/or formed in the sensor area SA.

The non-sensor area NSA may be provided in a peripheral area of the base layer BSL to overlap the non-display area DD_NDA (refer to FIG. 1). Here, the peripheral area may be an area surrounding the central portion of the base layer BSL. A sensing line SL electrically connected to the sensor electrode to receive and transfer a sensing signal is provided and/or formed in the non-sensing area DD_NSA. In addition, a pad unit PDA connected to the sensing line SL and electrically connected to the sensor electrode of the sensor area SA may be disposed in the non-sensor area NSA. The pad unit PDA may include a pad PD. The sensing line SL may include a plurality of first sensing lines SL1 and a plurality of second sensing lines SL2.

The sensor electrode may include a plurality of sensor patterns SP and first and second bridge patterns BRP1 and BRP2.

The sensor patterns SP may include a plurality of first sensor patterns SP1 (or first sensor electrodes) and a plurality of second sensor patterns SP2 (or second sensor electrodes) electrically insulated from the first sensor patterns SP1.

The first sensor patterns SP1 may be arranged in the first direction DR1 and may be electrically connected to the adjacent first sensor patterns SP1 by the first bridge patterns BRP1 to configure at least one sensor row. The second sensor patterns SP2 may be arranged in the second direction DR2 crossing the first direction DR1 and may be electrically connected to the adjacent second sensor patterns SP2 through the second bridge patterns BRP2 to configure at least one sensor column.

Each of the first and second sensor patterns SP1 and SP2 may be electrically connected to one pad PD through a corresponding sensing line SL. As an example, the first sensor patterns SP1 disposed in one row may be electrically connected to one pad PD through one of the first sensing line SL1, and the second sensor patterns SP2 disposed in one column may be electrically connected to one pad PD through one of the second sensing line SL2.

The first sensor patterns SP1 may be a driving electrode receiving a driving signal for detecting a touch position in the sensor area SA, and the second sensor patterns SP2 may be a sensing electrode outputting a sensing signal for detecting the touch point in the sensor area SA. However, the disclosure is not limited thereto, and the first sensor patterns SP1 may be the sensing electrode, and the second sensor patterns SP2 may be the driving electrode.

In an embodiment of the disclosure, the touch sensor TS may recognize the touch of the user by sensing a change amount of a mutual capacitance formed between the first and second sensor patterns SP1 and SP2.

FIGS. 6 and 7 show one cross area where the first sensor pattern SP1 and the second sensor pattern SP2 cross. FIG. 6 shows conductive patterns of the first conductive layer CPL1 corresponding to the cross area (hereinafter, first conductive patterns), and FIG. 7 shows conductive patterns of the second conductive layer CPL2 corresponding to the cross area (hereinafter referred to as second conductive patterns).

Each of the first and second conductive patterns (or the first and second sensor patterns SP1 and SP2) may include mesh lines MSL. The mesh lines MSL may cross each other to define a mesh hole MH. The mesh hole MH may overlap a light emitting element (or an emission area in which light is emitted) of the display panel DP (refer to FIG. 2). A portion of the mesh lines MSL may extend in a first diagonal direction CDR1 (or a first reference direction), and another portion of the mesh lines MSL may extend in a second diagonal direction CDR2 (or a second reference direction).

A portion of the first conductive patterns and a portion of the second conductive patterns may be connected to each other to form the first sensor pattern SP1. Similarly, another portion of the first conductive patterns and another portion of the second conductive patterns may be connected to each other to form the second sensor pattern SP2. That is, each of the first and second sensor patterns SP1 and SP2 may have a two-layer structure (or a multi-layer structure).

A portion of the first conductive patterns configuring the first sensor pattern SP1 may be defined as a first pattern, and a portion of the second conductive patterns may be defined as a second pattern. At this time, still another portion of the first conductive patterns configuring the second sensor pattern SP2 may be defined as a third pattern, and still another portion of the second conductive patterns may be defined as a fourth pattern. However, this definition may be a relative concept, a portion of the first conductive patterns configuring the second sensor pattern SP2 may be defined as the first pattern, and a portion of the second conductive patterns may be defined as the second pattern. Still another portion of the first conductive patterns configuring the first sensor pattern SP1 may be defined as the third pattern, and still another portion of the second conductive patterns may be defined as the fourth pattern.

As shown in FIGS. 6 to 8, the second sensor pattern SP2 may include a first pattern CP1 formed from the first conductive layer CPL1 and a second pattern CP2 formed from the second conductive layer CPL2. The first pattern CP1 and the second pattern CP2 may be electrically connected through a contact hole CNT formed through the first insulating layer TS_INS1. The first pattern CP1 and the second pattern CP2 may overlap each other in a plan view. The first pattern CP1 and the second pattern CP2 may completely overlap each other in a plan view, but are not limited thereto.

As shown in FIG. 6, the first pattern CP1 may include first sensor areas SA1 and first bridge areas BRA1 connecting the first sensor areas SA1. Two first sensor areas SA1 may be disposed spaced apart from each other in the second direction DR2. Each of two first bridge areas BRA1 may connect the two first sensor areas SA1. Each of the first bridge areas BRA1 may be or correspond to the first bridge pattern BRP1 (refer to FIG. 5). The two first bridge areas BRA1 may be spaced apart from each other in the first direction DR1. In FIG. 6, the number of first bridge areas BRA1 is two, but the disclosure is not limited thereto. For example, similarly to a second bridge area BRA2 described later, the two first sensor areas SA1 may be connected through only one first bridge area BRA1.

As shown in FIG. 7, the second pattern CP2 may include second sensor areas SA2 overlapping the first sensor areas SA1. Two second sensor areas SA2 may be disposed spaced apart from each other in the second direction DR2.

As shown in FIGS. 6 to 8, the first sensor pattern SP1 may include a third pattern CP3 formed from the first conductive layer CPL1 and a fourth pattern CP4 formed from the second conductive layer CPL2. The third pattern CP3 and the fourth pattern CP4 may be electrically connected through the contact hole CNT formed through the first insulating layer TS_INS1. The third pattern CP3 and the fourth pattern CP4 may overlap each other in a plan view.

As shown in FIG. 6, the third pattern CP3 may include third sensor areas SA3 and a dummy area DDA. The dummy area DDA may be spaced apart from the first sensor areas SA1 and the third sensor areas SA3, and may be disposed between the third sensor areas SA3 in the first direction DR1. In addition, the dummy area DDA may be disposed between the two first bridge areas BRA1 arranged in the first direction DR1.

The third pattern CP3 and the first pattern CP1 may be a first mesh pattern disposed in the same layer and disconnected each other in a first boundary line BDL1. In other words, the first pattern CP1 and the third pattern CP3 may be divided into different sensor areas by patterning the first mesh pattern along the first boundary line BDL1.

As shown in FIG. 7, the fourth pattern CP4 may include fourth sensor areas SA4 and a second bridge area BRA2. The second bridge area BRA2 may be or correspond to the second bridge pattern BRP2 (refer to FIG. 5). The fourth sensor areas SA4 may overlap the third sensor areas SA3 and the first bridge areas BRA1. The second bridge area BRA2 may overlap the dummy area DDA.

The fourth pattern CP4 and the second pattern CP2 may be a second mesh pattern disposed in the same layer and disconnected each other in a second boundary line BDL2. In other words, the second pattern CP2 and the fourth pattern CP4 may be divided into different sensor areas by patterning the second mesh pattern along the second boundary line BDL2.

The fourth sensor area SA4 may have the area greater than that of one third sensor area SA3 overlapping the fourth sensor area SA4. As shown in FIG. 6, the area of the third sensor area SA3 may be relatively small to secure an area where the first bridge areas BRA1 are to be disposed, but is not limited thereto.

As the first pattern CP1 and the second pattern CP2 are connected, and the third pattern CP3 and the fourth pattern CP4 are connected, a resistance of each of the first and second sensor patterns SP1 and SP2 may be reduced. Reduction of a combined resistance may improve sensitivity. For example, when the combined resistance is reduced, a wider AC signal bandwidth may be obtained. As the bandwidth is widened, sensing sensitivity of the touch sensor TS using a sinusoidal wave signal as the driving signal may be improved.

In addition, since the first and second sensor patterns SP1 and SP2 have a two-layer structure as a whole, an optical characteristic may be improved. Since a similar light amount is reflected from a conductive pattern of two layers throughout the touch sensor TS, a difference in visibility according to a sensor area may be minimized.

In an embodiment, a line width W1 of the mesh lines MSL (or the first mesh line) of the first conductive layer CPL1 and a line width W2 of the mesh lines MSL (or the second mesh line) of the second conductive layer CPL2 may be substantially the same. However, the disclosure is not limited thereto, and the line width W1 of the mesh lines MSL (or the first mesh line) of the first conductive layer CPL1 and the line width W2 of the mesh lines MSL (or the second mesh line) of the second conductive layer CPL2 may be different from each other (refer to FIGS. 12 and 13).

Referring to FIGS. 6, 7, and 9, each of the mesh line MSL of the first conductive layer CPL1 and the mesh line MSL of the second conductive layer CPL2 may extend in the first diagonal direction CDR1, and the mesh line MSL of the first conductive layer CPL1 and the mesh line MSL of the second conductive layer CPL2 may overlap each other in the third direction DR3.

The mesh line MSL of the first conductive layer CPL1 may include a first cutting area CA1 partially cut (or a first open area partially open) along the first boundary line BDL1 (or a first cutting line). For example, a portion of the mesh line MSL corresponding to the first cutting area CA1 may be removed, and thus the mesh line MSL of the first conductive layer CPL1 may be separated into a first mesh line MSL1 and a third mesh line MSL3. Similarly, the mesh line MSL of the second conductive layer CPL2 may include a second cutting area CA2 (or a second open area CA2) partially cut along the second boundary line BDL2 (or a second cutting line). For example, a portion of the mesh line MSL corresponding to the second cutting area CA2 may be removed, and thus the mesh line MSL of the second conductive layer CPL2 may be separated into a second mesh line MSL2 and a fourth mesh line MSL4.

In embodiments, in a plan view (or in the third direction DR3), the first cutting area CA1 and the second cutting area CA2 may not overlap each other. In this case, the first cutting area CA1 and the second cutting area CA2 (the first and second boundary lines BDL1 and BDL2 corresponding thereto, or an edge of the first and second sensor patterns SP1 and SP2) may not be visually recognized by the user.

As shown in FIG. 10, mesh lines MSL1_C to MSL4_C may respectively correspond to the mesh lines MSL1 to MSL4 of FIG. 9. The mesh lines MSL1_C to MSL4_C may extend in the first diagonal direction CDR1 and a cutting area CA between the first mesh line MSL1_C and the third mesh line MSL3_C and a cutting area between the second mesh line MSL2_C and the fourth mesh line MSL4_C may overlap in a plan view. Light proceeding from a lower portion (for example, the display panel DP, refer to FIG. 2) toward the mesh lines MSL1_C to MSL4_C (for example, in the second diagonal direction CDR2) may be reflected through a side of the mesh lines MSL1_C to MSL4_C. Light is not reflected in the cutting area CA. Since a light amount reflected in the cutting area CA is less than a light amount reflected in a remaining area (that is, the mesh lines MSL1_C to MSL4_C), in particular, the cutting area CA of the first conductive layer and the cutting area CA of the second conductive layer overlap and light is not reflected, the cutting area CA may be visually recognized darkly compared to another area.

Referring to FIG. 11, a first image IMAGE1 is an image obtained by capturing the touch sensor according to a comparative example of FIG. 10 in the third direction DR3, and a black dot and black lines extending in a diagonal direction are visually recognized. Here, the black dot may correspond to a bridge pattern, and the black line may correspond to the cutting area CA.

A second image IMAGE2 is an image obtained by capturing the touch sensor TS according to the embodiment of FIGS. 5 to 9 in the third direction DR3, and black lines are not visually recognized compared to the first image IMAGE1. That is, since the first and second cutting areas CA1 and CA2 do not overlap each other, a similar light amount may be reflected from the mesh lines MSL1 to MSL4 (and the first and second conductive layers CPL1 and CPL2 including the same), a visibility difference according to a sensor area may be minimized.

In an embodiment, in a plan view (or in the third direction DR3), the first cutting area CA1 may be spaced apart from the second cutting area CA2 by a distance D0 greater than a width of the first and second cutting areas CA1 and CA2. For example, a width of the first cutting area CA1 may be about 1 μm or more for electrical insulation between the first and second mesh lines MSL1 and MSL2, and a width of the second cutting area CA2 may be about 1 μm or more for electrical insulation between the third and fourth mesh lines MSL3 and MSL4. The width of the first cutting area CA1 and the width of the second cutting area CA2 may be the same, but are not limited thereto. For example, the width of the first cutting area CA1 and the width of the second cutting area CA2 may be different from each other, or the width of the first cutting area CA1 may be greater than the width of the second cutting area CA2. The width of the first and second cutting areas CA2 may be less than a size of the mesh hole MH (for example, 50 μm). For example, the distance D0, which is the shortest distance between the first cutting area CA1 and the second cutting area CA2, may be about 1.5 μm to about 15 μm. For reference, a thickness of each of the mesh lines MSL1 to MSL4 may be about 1000 Å to about 2000 Å, for example, in the mesh lines MSL1 to MSL4 having a three-layer structure of Ti/Al/Ti, a thickness of titanium (Ti) may be about 150 Å to about 300 Å, and a thickness of aluminum (Al) may be about 1000 Å to about 1500 Å.

In an embodiment, in a plan view (or in the third direction DR3), the first cutting area CA1 may be spaced apart from the second cutting area CA2 by a distance D0 of about 2 μm or more. For reference, an error may occur in the distance D0 between the first cutting area CA1 and the second cutting area CA2 due to a misalignment between masks for forming the first cutting area CA1 and the second cutting area CA2. The misalignment is measured as a maximum of 1.35 µm, and the misalignment may vary according to a process condition. Even though the misalignment occurs, the distance D0 between the first cutting area CA1 and the second cutting area CA2 may be set (or designed) to 2 µm or more so that the first cutting area CA1 and the second cutting area CA2 do not overlap each other.

In an embodiment, in a plan view, a plurality of first cutting areas CA1 may be positioned along the first boundary line BDL1, a plurality of cutting areas CA2 may be positioned along the second boundary line BDL2, and the first boundary line BDL1 and the second boundary line BDL2 may cross each other in some of the mesh hole MH but may not extend along the same direction while overlapping each other in a plan view. For example, the first boundary line BDL1 and the second boundary line BDL2 may be arranged in a zigzag form.

As shown in FIGS. 6 and 7, based on one mesh hole MH, the first boundary line BDL1 may be relatively adjacent to an upper mesh line MSL, and the second boundary line BDL2 may be relatively adjacent to a lower mesh line MSL. In this case, all of the first cutting area CA1 along the first boundary line BDL1 and all of the second cutting area CA2 along the second boundary line BDL2 may not overlap each other.

As described above, the first and second sensor patterns SP1 and SP2 may have a two-layer structure (the first and second conductive layers CPL1 and CPL2) as a whole. In addition, the first cutting area CA1 (or the first open area) of the mesh line MSL of the first conductive layer CPL1 and the second cutting area CA2 (or the second open area) of the mesh line MSL of the second conductive layer CPL2 may be arranged not to overlap each other. Accordingly, a similar light amount may be reflected from the first and second conductive layers CPL1 and CPL2 throughout the touch sensor TS, and a visibility difference according to the sensor area may be minimized.

Meanwhile, in FIGS. 6 to 10, in a plan view, the first and second cutting areas CA1 and CA2 are positioned at the edge of the first and second sensor patterns SP1 and SP2, but are not limited thereto. For example, in a plan view, the first and second cutting areas CA1 and CA2 may be positioned inside the first and second sensor patterns SP1 and SP2, and may be spaced apart from the edge of the first and second sensor patterns SP1 and SP2 (or a boundary between the first and second sensor patterns SP1 and SP2) (refer to FIGS. 14 to 16).

Figure 12:
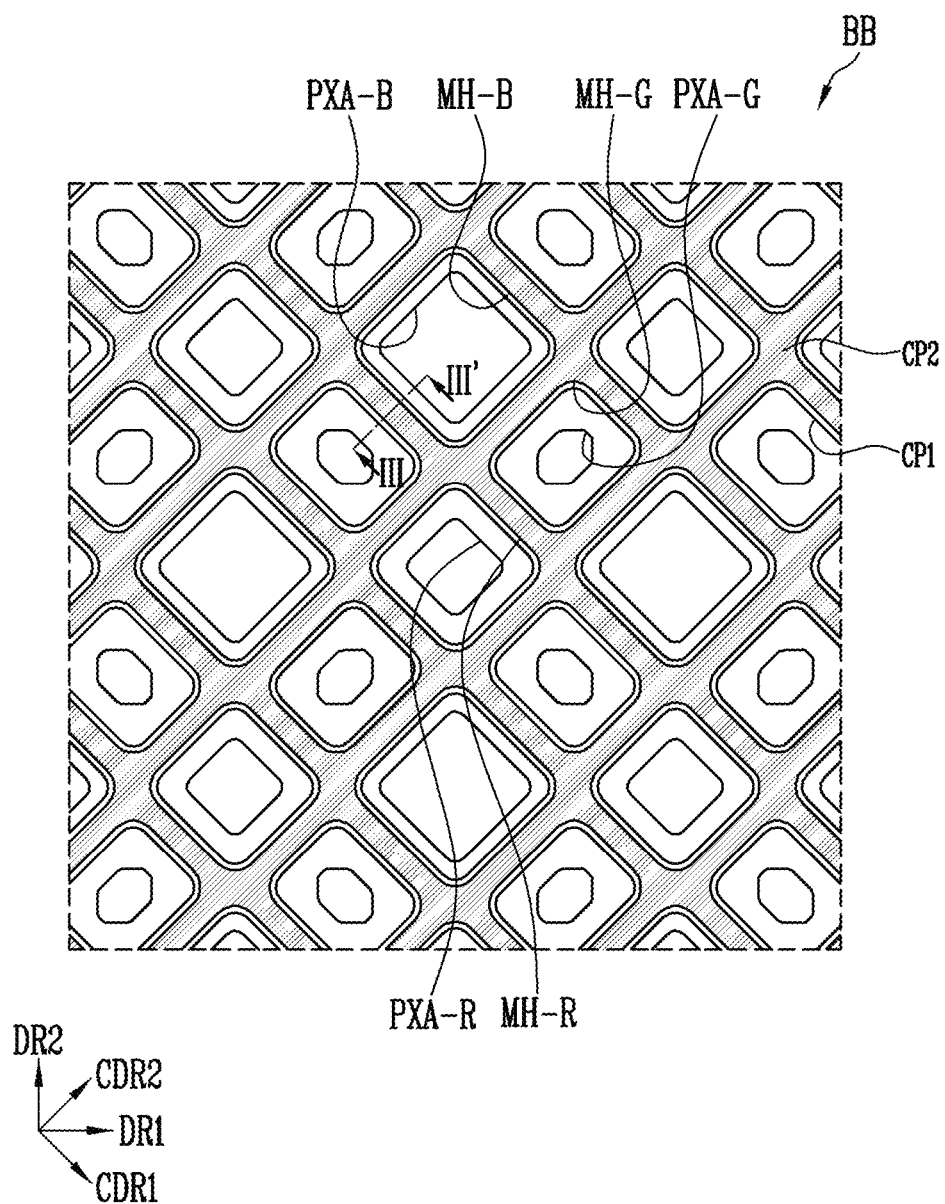
FIG. 12 is an enlarged plan view of a BB area of FIG. 5.
Figure 13:
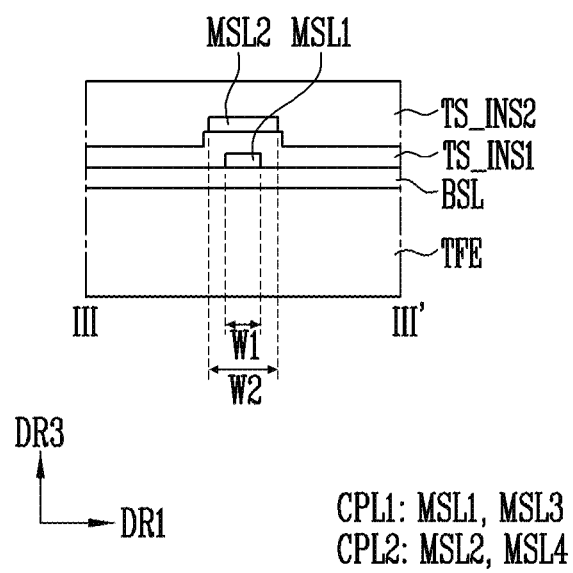
FIG. 13 is a cross-sectional view taken along a line III-III' of FIG. 12.

FIG. 12 is an enlarged plan view of a BB area of FIG. 5. In FIG. 12, a portion of the second sensor pattern SP2 is enlarged, and the first pattern CP1 of FIG. 6 and the second pattern CP2 of FIG. 7 are overlapped. FIG. 13 is a cross-sectional view taken along a line III-III' of FIG. 12.

Referring to FIGS. 5, 6, 7, and 12, three types of mesh holes MH-R, MH-G, and MH-B may be defined. The mesh holes MH-R, MH-G, and MH-B may be defined in each of the first pattern CP1 and the second pattern CP2. The three types of mesh holes MH-R, MH-G, and MH-B may correspond to three types of light emitting openings PXA-R, PXA-G, and PXA-B. The three types of light emitting openings PXA-R, PXA-G, and PXA-B may be defined identically to the light emitting elements included in the pixel of the display panel DP (refer to FIG. 2) (or openings of a pixel defining layer for disposing the light emitting elements). The three types of openings PXA-R, PXA-G, and PXA-B may be classified according to the area, an area of a first type of opening PXA-R, a second type of opening PXA-G, and a third type of opening PXA-B may be proportional to a light emitting area of a corresponding pixel.

Different from the mesh lines MSL shown as a straight line in FIGS. 6 and 7, the mesh lines MSL shown in FIG. 12 may include inflection points (or a curved portion). This is because the mesh lines MSL define the mesh holes MH-R, MH-G, and MH-B.

Referring to FIGS. 12 and 13, in an embodiment, a line width W1 of the first mesh line MSL1 of the first conductive layer CPL1 and a line width W2 of the second mesh line MSL2 of the second conductive layer CPL2 may be different from each other.

For example, the line width W2 of the second mesh line MSL2 of the second conductive layer CPL2 may be greater than the line width W1 of the first mesh line MSL1 of the first conductive layer CPL1, and in a plan view, the second mesh line MSL2 may substantially cover (or clad) the first mesh line MSL1. In this case, light proceeding from a lower portion toward the first and second mesh lines MSL1 and MSL2 may be substantially reflected through only a side surface of the second mesh line MSL2. The line width W2 of the second mesh line MSL2 may be determined with reference to a proceed direction (for example, a viewing angle) of the light proceeding from the lower portion toward the first and second mesh lines MSL1 and MSL2, a process error, the line width W1 of the first mesh line MSL1, and the like.

Referring to FIG. 9, for example, the first cutting area CA1 may be covered by the second mesh line MSL2, a light amount difference caused by the first cutting area CA1 of the first mesh line MSL1 may be reduced by the second mesh line MSL2 which covers the first cutting area CA1, and the first cutting area CA1 may not be visually recognized. In addition, since a light amount difference caused by the second cutting area CA2 of the second mesh line MSL2 is not large between the second cutting area CA2 and a remaining area, the second cutting area CA2 may not be visually recognized. Accordingly, when the second mesh line MSL2 covers the first mesh line MSL1, even though the first cutting area CA1 and the second cutting area CA2 overlap each other as disclosed in FIG. 10, the cutting area CA may not be visually recognized by the user. That is, an embodiment of FIG. 13 may be independent of the embodiment of FIG. 9. However, the disclosure is not limited thereto.

In an embodiment, the embodiment of FIG. 13 may also be applied to the embodiment of FIG. 9. As described with reference to FIG. 9, when the first cutting area CA1 and the second cutting area CA2 do not overlap each other, light may be reflected by the third mesh line MSL3 of the first conductive layer CPL1 in the second cutting area CA2, and light may be reflected by the second and fourth mesh lines MSL2 and MSL4 of the second conductive layer CPL2 covering the first conductive layer CPL1 in a remaining area except for the second cutting area CA2. Therefore, regardless of the first and second cutting areas CA1 and CA2, the same or similar light amount may be reflected throughout the touch sensor TS, and the first and second cutting areas CA1 and CA2 may not be visually recognized.

Figure 14:
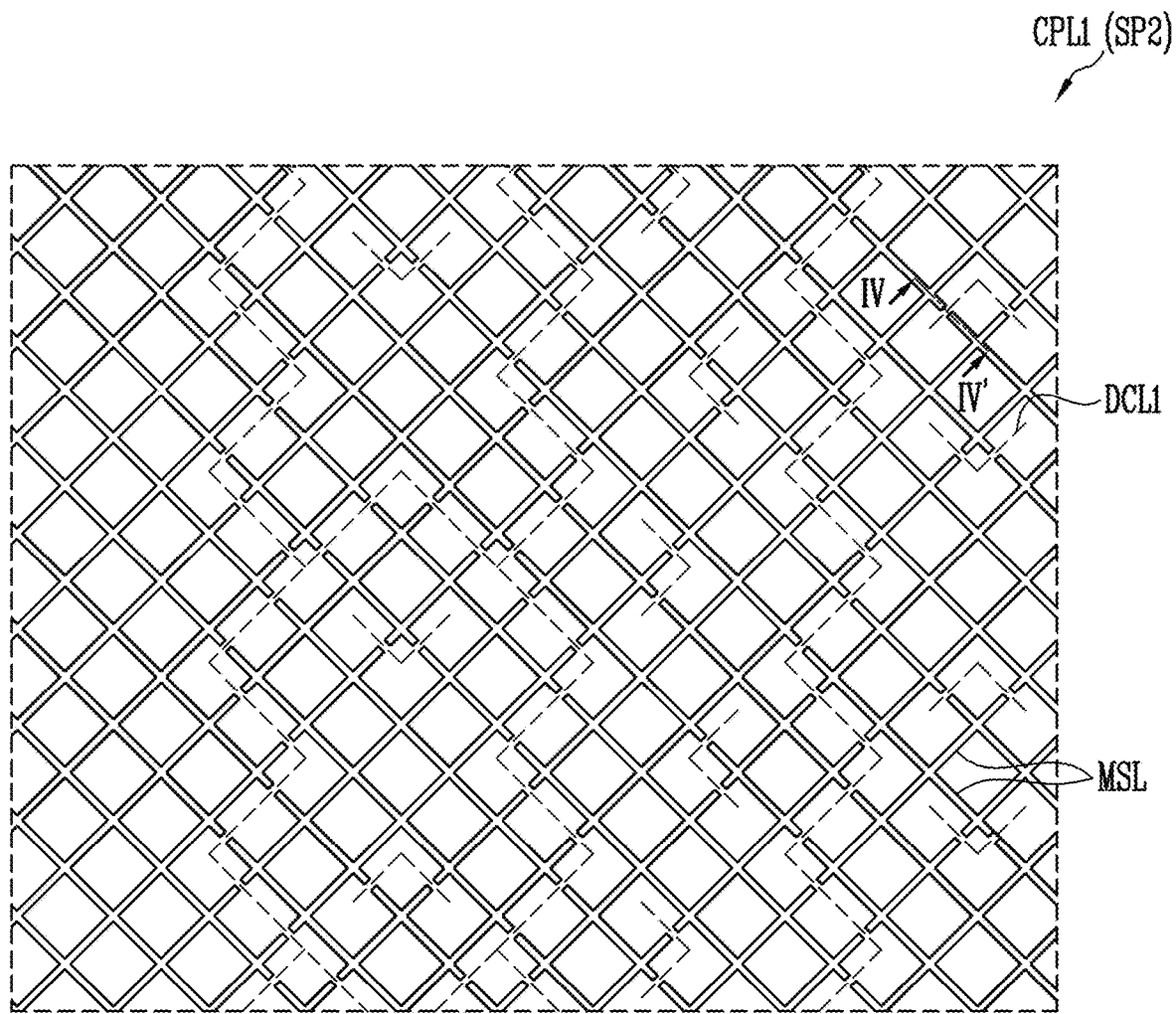
FIGS. 14, 15, and 16 are enlarged plan views of the BB area of FIG. 5.
Figure 15:
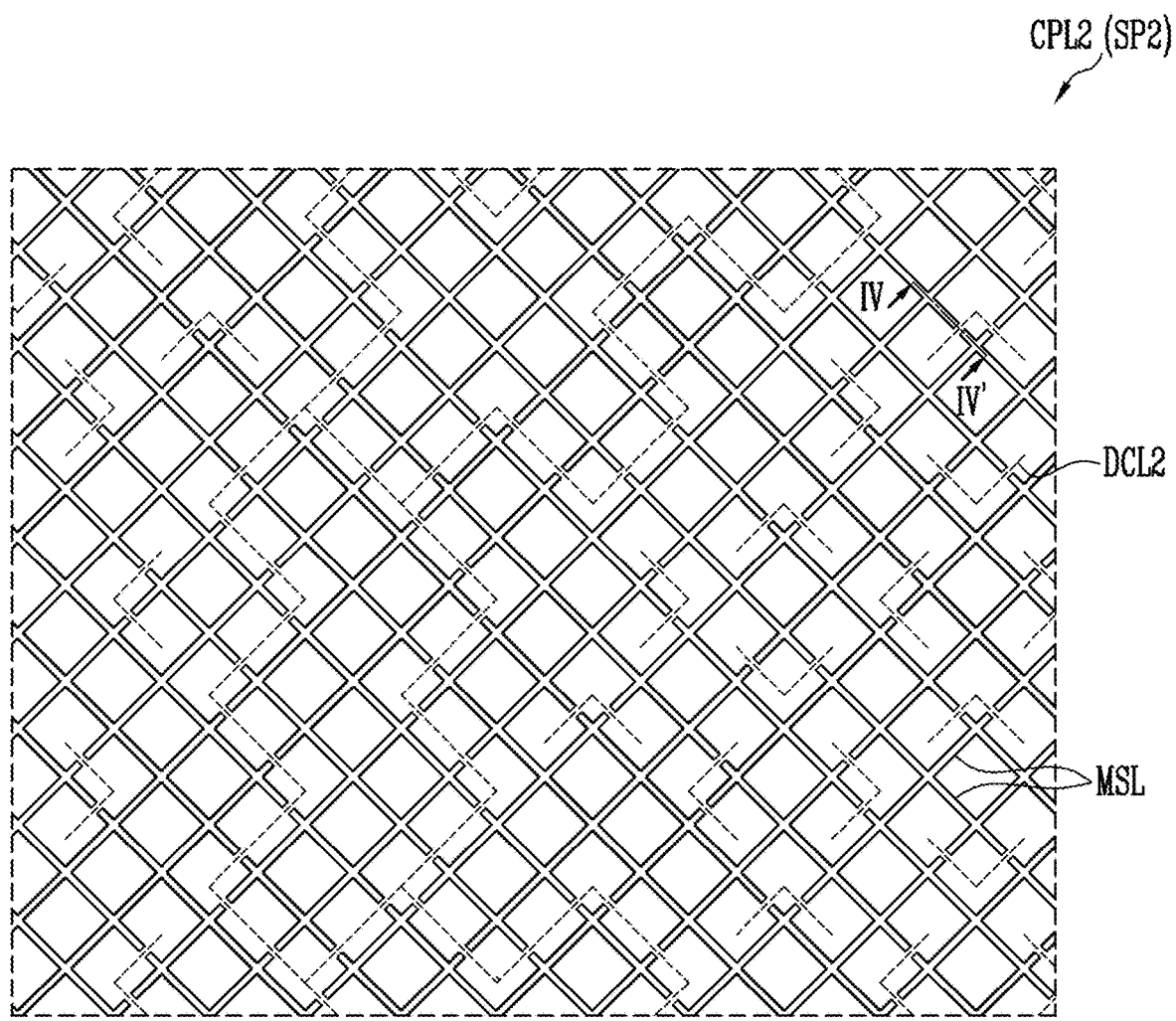
Figure 16:
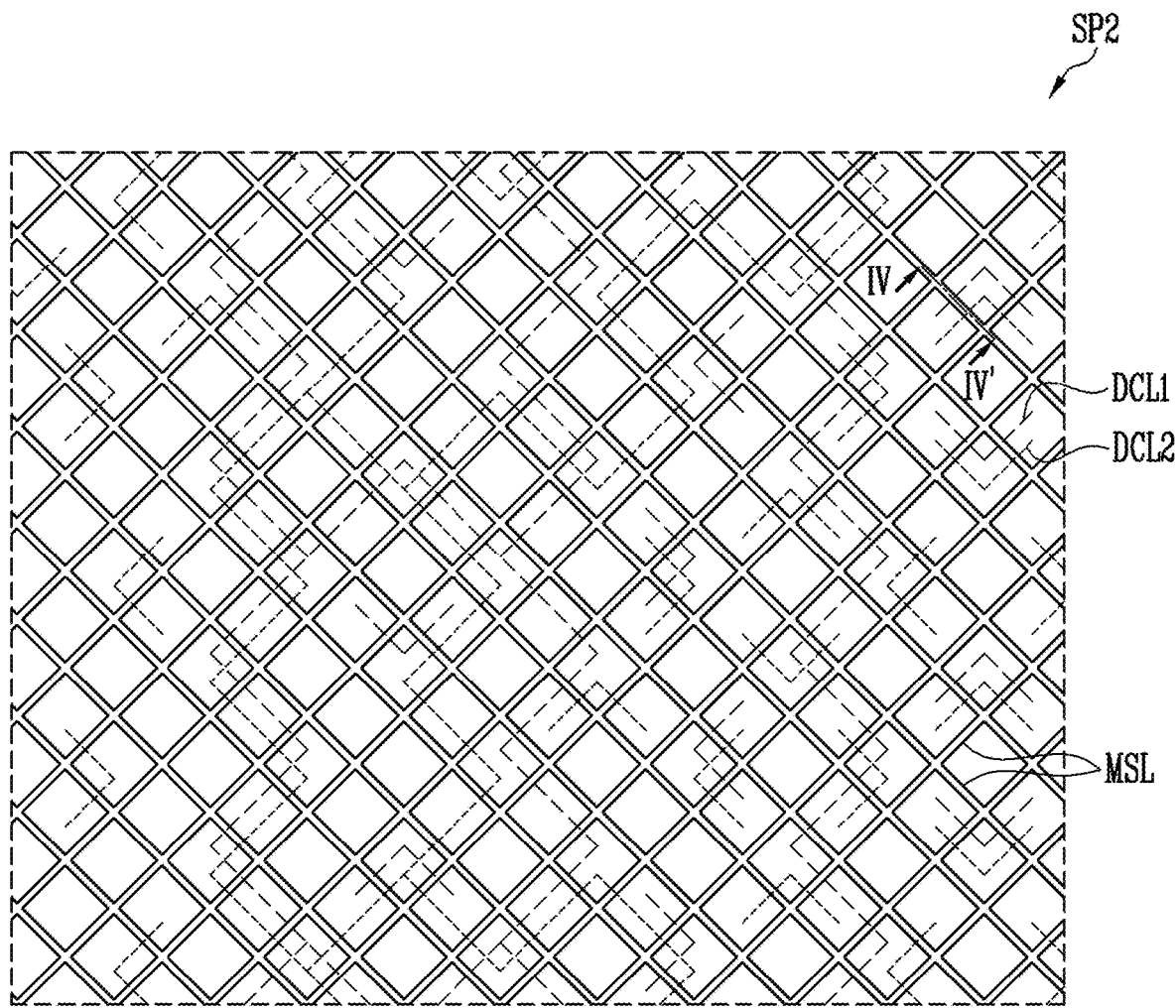

FIGS. 14, 15, and 16 are enlarged plan views of the BB area of FIG. 5. FIGS. 14, 15, and 16 show an enlarged portion of the second sensor pattern SP2. FIGS. 14 shows the first conductive layer CPL1, FIG. 15 shows the second conductive layer CPL2, and FIG. 16 shows the first conductive layer CPL1 of FIG. 14 and the second conductive layer CPL2 of FIG. 15 overlapping each other. A cross-section taken along a line IV-IV' of FIGS. 14 to 16 may be substantially the same as that of FIG. 9.

Referring to FIGS. 5 to 9 and 14 to 16, except for first and second dummy cutting lines DCL1 and DCL2 (and the first and second cutting areas CA1 and CA2 corresponding thereto), the second sensor pattern SP2 (or the first and second patterns CP1 and CP2) of FIGS. 14 to 16 may be substantially identical or similar to the second sensor pattern SP2 (or the first and second patterns CP1 and CP2) described with reference to FIGS. 5 to 9. Therefore, an overlapping description may not be repeated. Meanwhile, an embodiment of FIGS. 15 and 16 may also be applied to another configuration (for example, the first sensor pattern SP1) of the sensor area SA of FIG. 5.

Inside the second sensor pattern SP2, the mesh line MSL of the first conductive layer CPL1 may include the first cutting area CA1 (or the first open area) partially cut based on a first dummy cutting line DCL1 (or a first cutting line). The first dummy cutting line DCL1 may be a line connecting the first cutting area CA1 (that is, a cut or open area of the mesh line MSL of the first conductive layer CPL1), may include a straight line extending in the first diagonal direction CDR1 and a straight line extending in the second diagonal direction CDR2, and may not overlap the mesh line MSL of the first conductive layer CPL1. For example, the first dummy cutting line DCL1 may have a shape of "/\", "\/", "<", or ">".

Similarly, inside the second sensor pattern SP2, the mesh line MSL of the second conductive layer CPL2 may include the second cutting area CA2 (or a second open area) partially cut based on a second dummy cutting line DCL2 (or a second cutting line). The second dummy cutting line DCL2 may be a line connecting the second cutting area CA2 (that is, a cut or open area of the mesh line MSL of the second conductive layer CPL2), may include a straight line extending in the first diagonal direction CDR1 and a straight line extending in the second diagonal direction CDR2, and may not overlap the mesh line MSL of the second conductive layer CPL2. The second dummy cutting line DCL2 may have a shape corresponding to the first dummy cutting line DCL1.

By the first and second cutting areas CA1 and CA2 along the first and second dummy cutting lines DCL1 and DCL2, an optical characteristic (that is, a reflected light amount considering the first and second cutting areas CA1 and CA2) inside the second sensor pattern SP2 may be identical or similar to an optical characteristic at an edge of the second sensor pattern SP2, and a visibility difference may be minimized.

In embodiments, in a plan view (or in the third direction DR3), the first dummy cutting line DCL1 and the second dummy cutting line DCL2 may cross each other in some of the mesh hole MH but may not extend along the same direction while overlapping each other in a plan view, and the first cutting area CA1 according to the first dummy cutting line DCL1 and the second cutting area CA2 according to the second dummy cutting line DCL2 may not overlap each other. For example, as shown in FIG. 16, the first dummy cutting line DCL1 and the second dummy cutting line DCL2 having the same shape and adjacent to each other may be arranged in a zigzag form. For example, on a line IV-IV', the first dummy cutting line DCL1 may be relatively adjacent to the upper mesh line MSL, and the second dummy cutting line DCL2 may be relatively adjacent to the lower mesh line MSL.

Since the first and second cutting areas CA1 and CA2 do not overlap, the first and second cutting areas CA1 and CA2 disposed along the first and second dummy cutting lines DCL1 and DCL2 may not be visually recognized.

Figure 17:
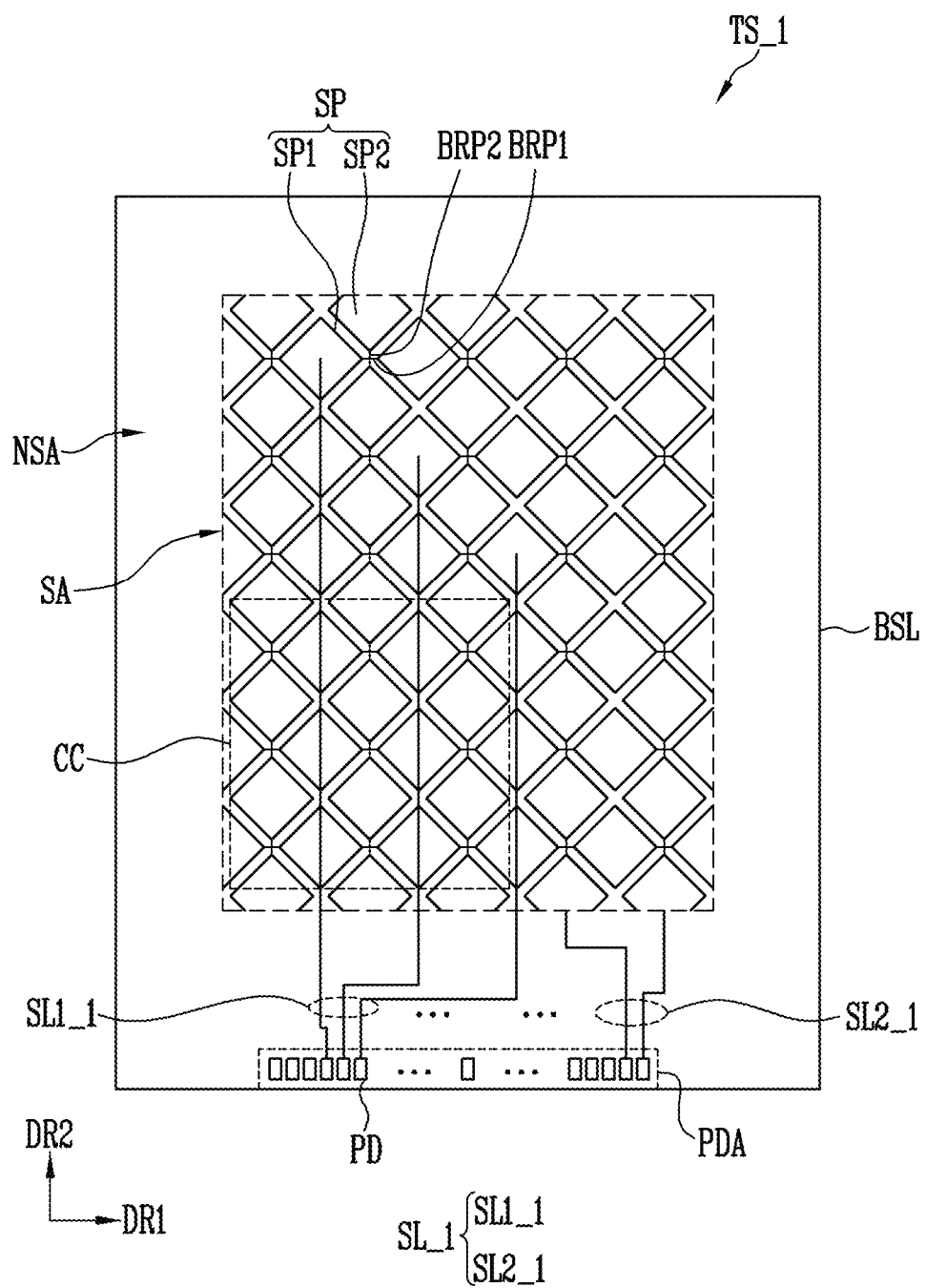
FIG. 17 is a plan view schematically illustrating an embodiment of the touch sensor of FIG. 4.
Figure 18:
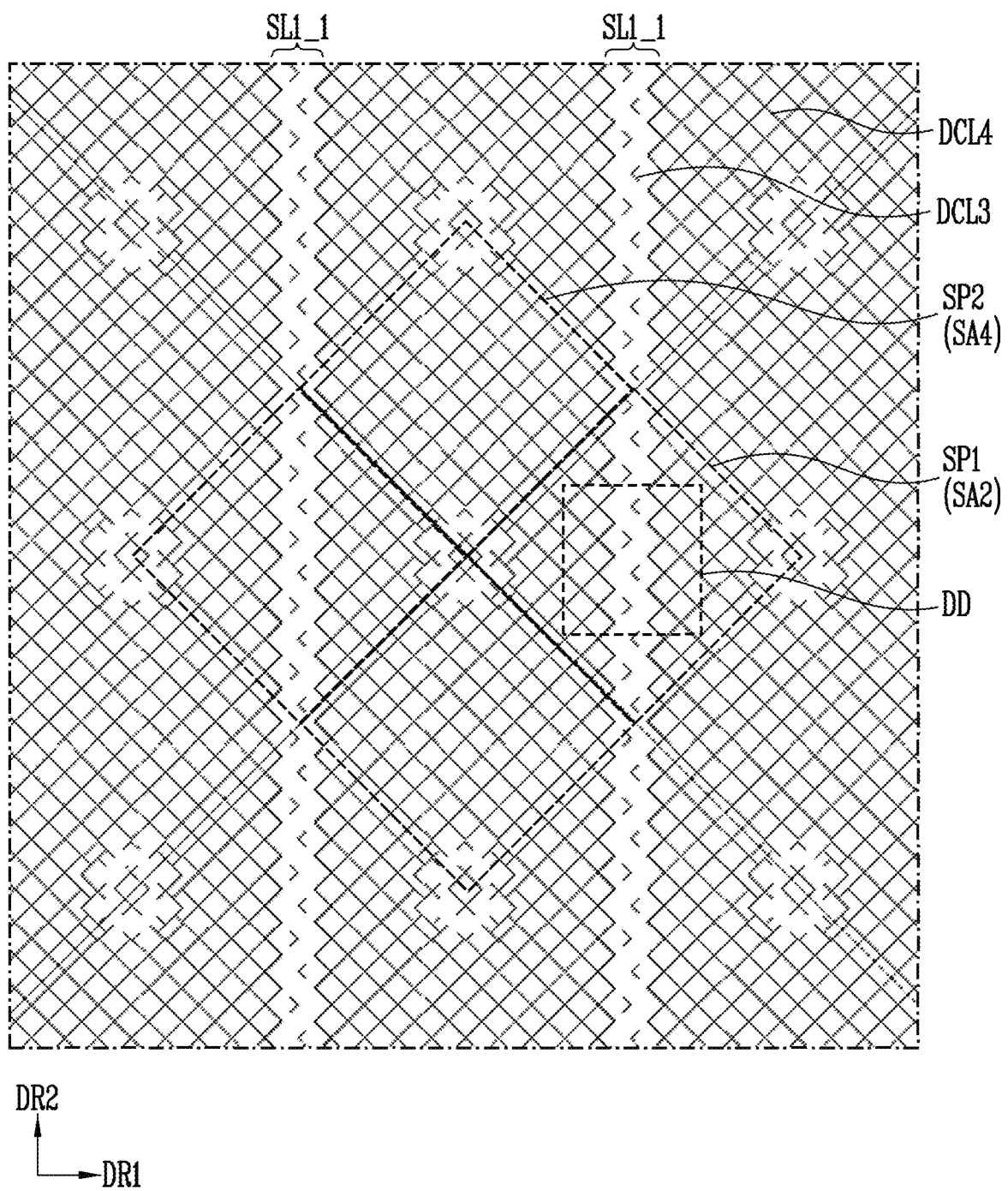
FIG. 18 is an enlarged plan view of a CC area of FIG. 17.
Figure 19:
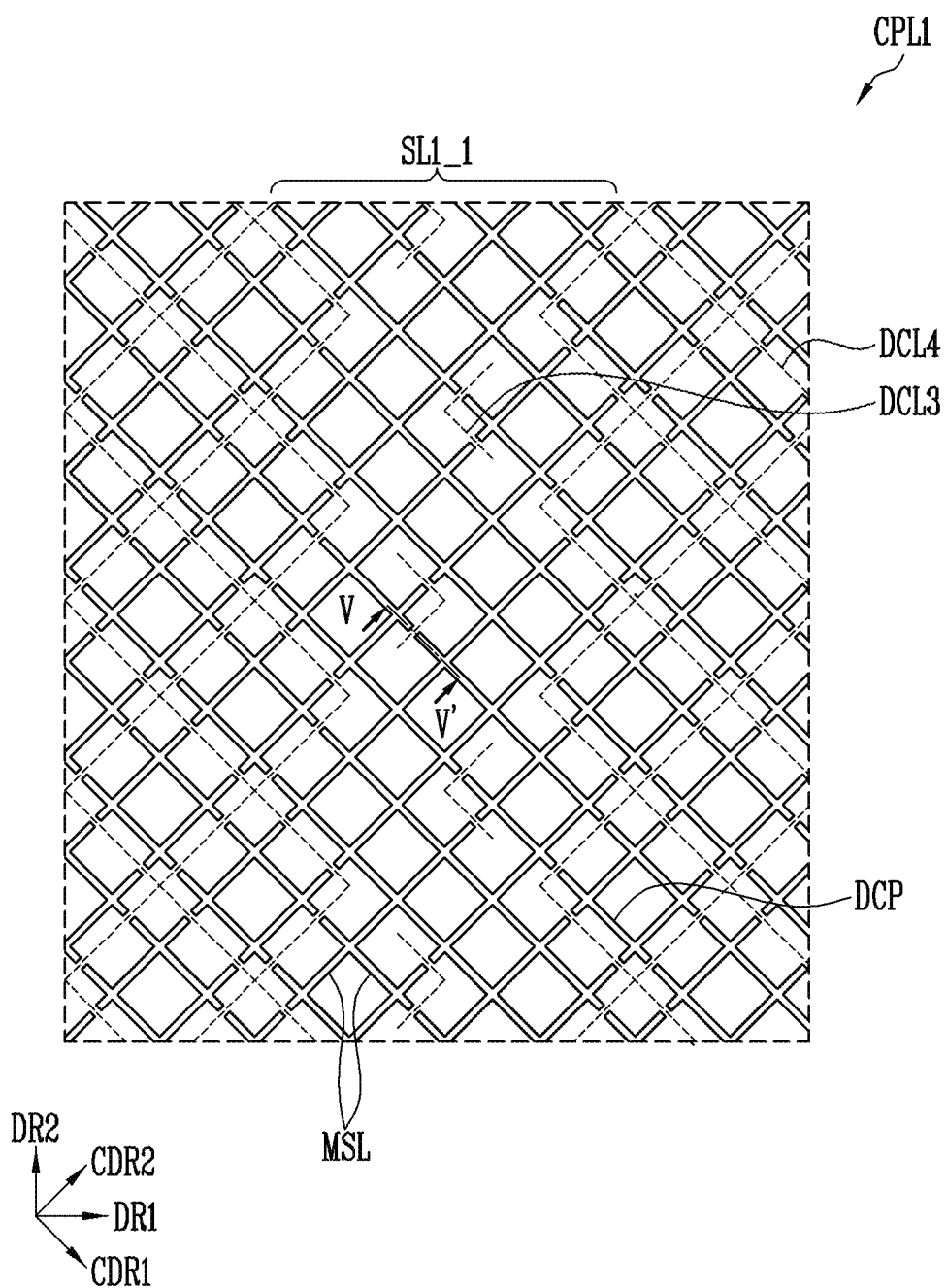
FIGS. 19 and 20 are enlarged plan views of a DD area of FIG. 18.
Figure 20:
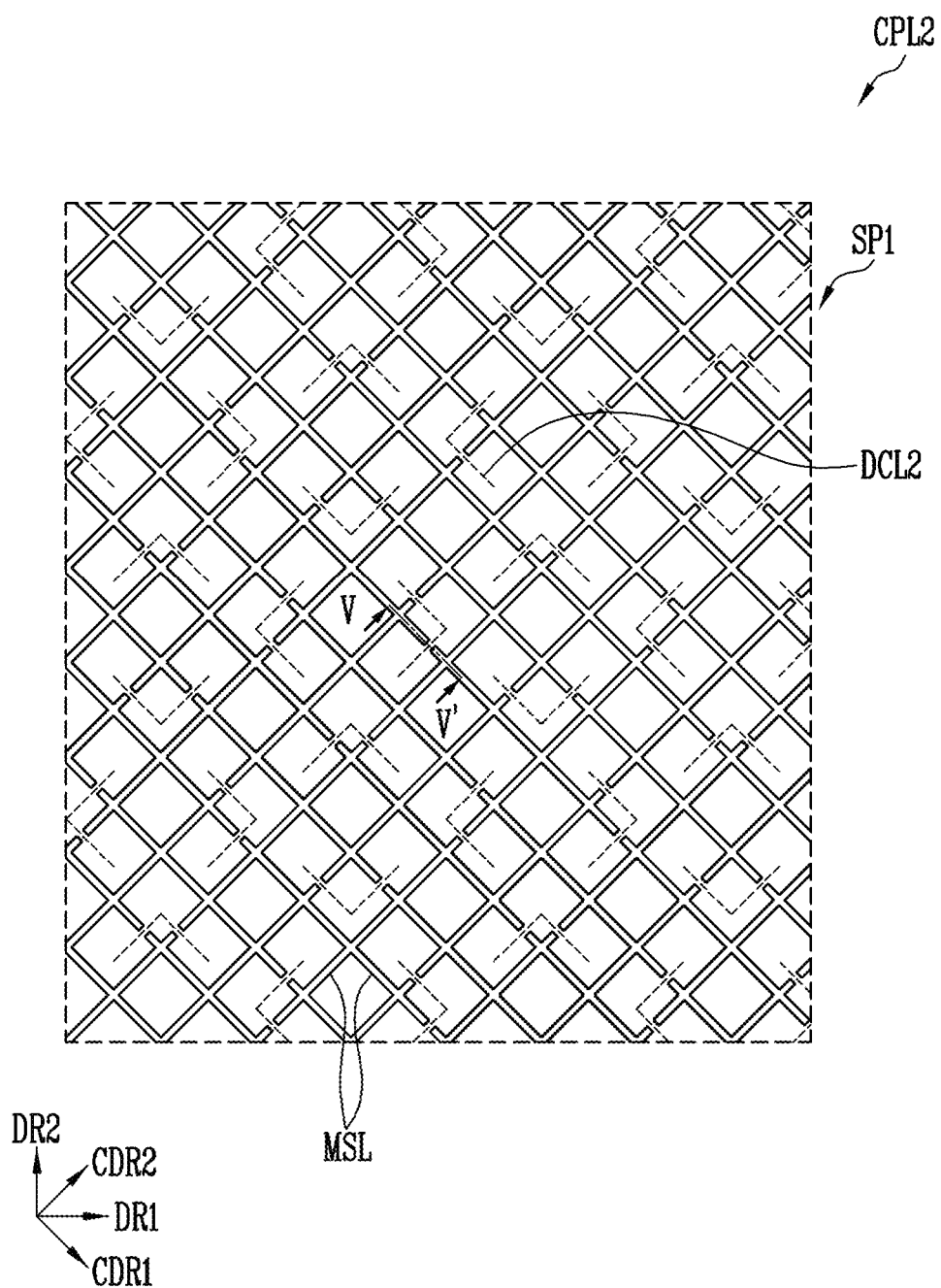

FIG. 17 is a plan view schematically illustrating an embodiment of the touch sensor of FIG. 4. FIG. 18 is an enlarged plan view of a CC area of FIG. 17. In FIG. 18, a first sensing line SL1_1 is briefly shown based on third and fourth dummy cutting lines DCL3 and DCL4. FIGS. 19 and 20 are enlarged plan views of a DD area of FIG. 18. FIG. 19 shows the first conductive layer CPL1, and FIG. 20 shows the second conductive layer CPL2. A cross-section taken along a line V-V' of FIGS. 19 and 20 may be substantially the same as that of FIG. 9.

Referring to FIGS. 4, 5, and 17, the touch sensor TS_1 of FIG. 17 may be substantially identical or similar to the touch sensor TS of FIG. 5 except for a sensing line SL_1. Therefore, an overlapping description may not be repeated.

The sensing line SL_1 may include a first sensing line SL1_1 and a second sensing line SL2_1. The second sensing line SL2_1 may be arranged between the sensor area SA and the pad unit PDA, and the second sensor pattern SP2 may be electrically connected to the pad PD through the second sensing line SL2_1.

The first sensing line SL1_1 (or trace line) may overlap the sensor area SA, and the first sensor pattern SP1 may be electrically connected to the pad PD through the first sensing line SL1_1. The first sensing line SL1_1 may be arranged along the first direction DR1, and each first sensing line SL1_1 may be electrically connected to the first sensor pattern SP1 of each row. The first sensing line SL1_1 may extend in the second direction DR2. According to an embodiment, the first sensing line SL1_1 may extend in a diagonal direction for a connection to a corresponding first sensor pattern SP1.

The first sensing line SL1_1 may overlap the sensor pattern SP (for example, the first sensor pattern SP1).

When the first sensing line SL1_1 is arranged in the sensor area SA, the non-sensor area NSA (for example, upper, left, and right non-sensor areas NSA) may be reduced. In addition, compared to a case where the first sensing line SL1_1 is disposed in the non-sensor area NSA, when the first sensing line SL1_1 is disposed in the senor area SA, a length of the first sensing line SL1_1 and a delay of a signal (for example, a driving signal) applied to the first sensing line SL1_1 may be reduced, and reliability of the touch sensor TS_1 may be improved.

In an embodiment, the first sensing line SL1_1 may be disposed in the first conductive layer CPL1, may include the mesh lines MSL, and may include a cutting area (for example, a cutting area corresponding to the first cutting area CA1 of FIG. 9, hereinafter referred to as a dummy cutting area) where the mesh lines MSL are partially cut along the third dummy cutting line DCL3 (or a third cutting line).

As shown in FIGS. 18 and 19, in the first conductive layer CPL1, the first sensing line SL1_1 (or a first pattern) may include the mesh lines MSL extending in the first diagonal direction CDR1 and the second diagonal direction CDR2. The first sensing line SL1_1 may have a line width corresponding to about two mesh holes in the first direction DR1 and may entirely extend in the second direction DR2. The mesh lines MSL of the first sensing line SL1_1 may include a dummy cutting area cut based on the third dummy cutting line DCL3. For example, the third dummy cutting line DCL3 may have a shape of "<" or ">". However, the third dummy cutting line DCL3 is not limited thereto, and the third dummy cutting line DCL3 may have a shape of "/\" or "\/". The mesh lines MSL of the first sensing line SL1_1 may be electrically connected to each other through an area that does not overlap the third dummy cutting line DCL3.

Meanwhile, in the first conductive layer CPL1, dummy patterns DCP may be disposed in an area except for an area where the first sensing line SL1_1 is disposed. The dummy patterns DCP may include the mesh lines MSL and may be spaced apart from each other along the fourth dummy cutting line DCL4 (or a fourth cutting line). When the fourth dummy cutting line DCL4 is arranged in a mesh shape, the dummy patterns DCP may be electrically separated from each other and may be floated. However, the disclosure is not limited thereto, and according to a shape of the fourth dummy cutting line DCL4, at least a portion of the dummy patterns DCP may be electrically connected to each other. The entire dummy patterns DCP may be referred to as a dummy electrode.

Since the first sensing line SL1_1 includes the dummy cutting area along the third dummy cutting line DCL3 (and since the dummy patterns DCP are cut along the fourth dummy cutting line DCL4), an optical characteristic of an edge area of the sensing line SL1_1 and an optical characteristic of a remaining area (that is, an inside of the first sensing line SL1_1 and an area where the first sensing line SL1_1 is not disposed) may become identical or similar to each other, and the first sensing line SL1_1 (or an edge thereof) may not be visually recognized.

In the second conductive layer CPL2, the first sensor pattern SP1 (or a second pattern) may include a second cutting area CA2 (refer to FIG. 9) in which the mesh line MSL is partially cut along the second dummy cutting line DCL2. For example, the second dummy cutting line DCL2 may have a shape of "∧", "∨", "<", or ">".

In embodiments, in a plan view, the third dummy cutting line DCL3 and the second dummy cutting line DCL2 may cross each other in some of the mesh hole MH but may not extend along the same direction while overlapping each other in a plan view. For example, as shown in FIGS. 19 and 20, in an area where the first sensing line SL1_1 is disposed, the third dummy cutting line DCL3 and the second dummy cutting line DCL2 may be arranged in a zigzag form. For example, on a line V-V', the third dummy cutting line DCL3 may be relatively adjacent to the upper mesh line MSL, and the second dummy cutting line DCL2 may be relatively adjacent to the lower mesh line MSL.

Since the dummy cutting area of the first sensing line SL1_1 and the second cutting area of the first sensor pattern SP1 do not overlap, the dummy cutting area and the second cutting area may not be visually recognized.

Figure 21:
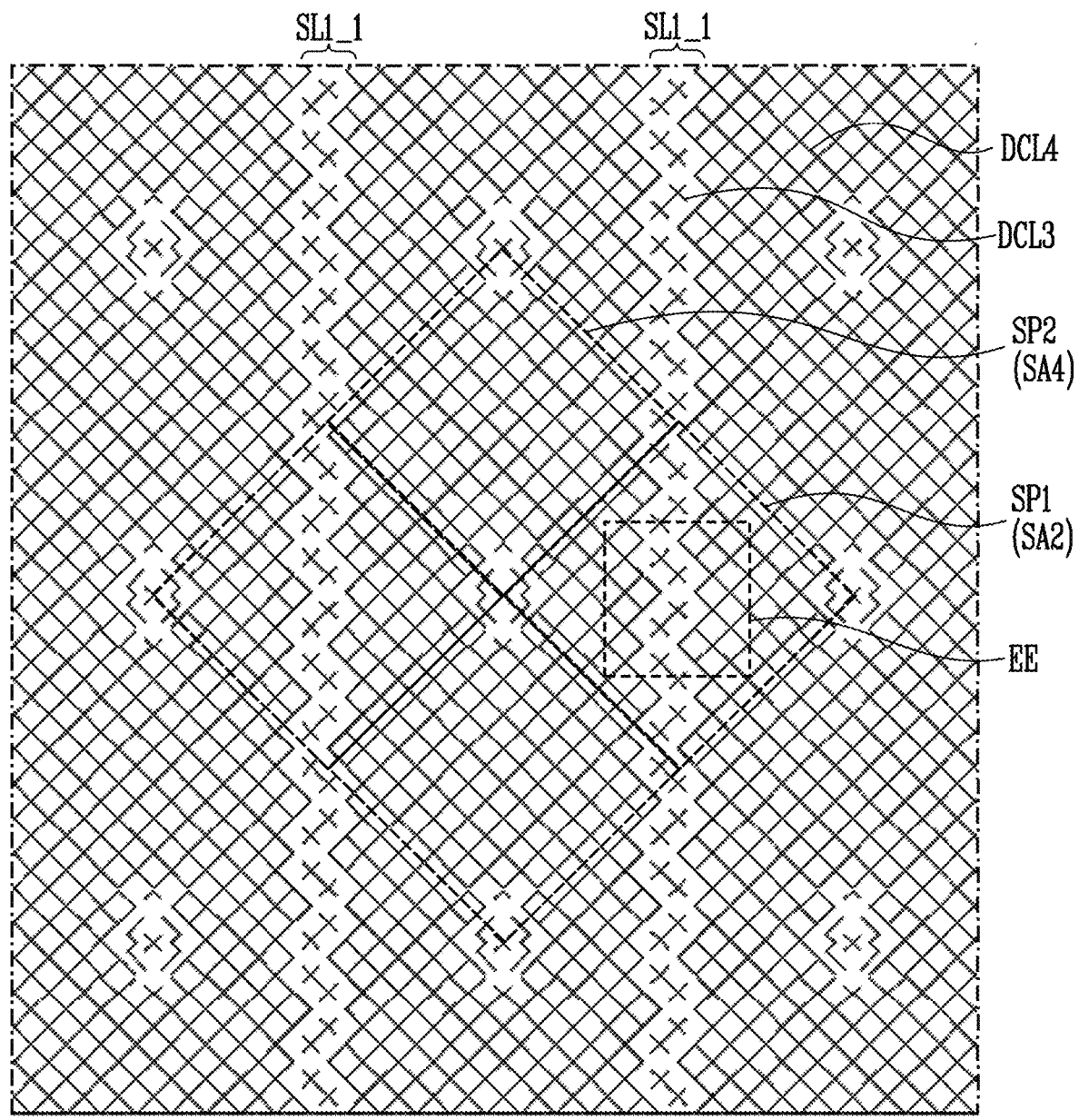
FIG. 21 is an enlarged plan view of the CC area of FIG. 17.
Figure 22:
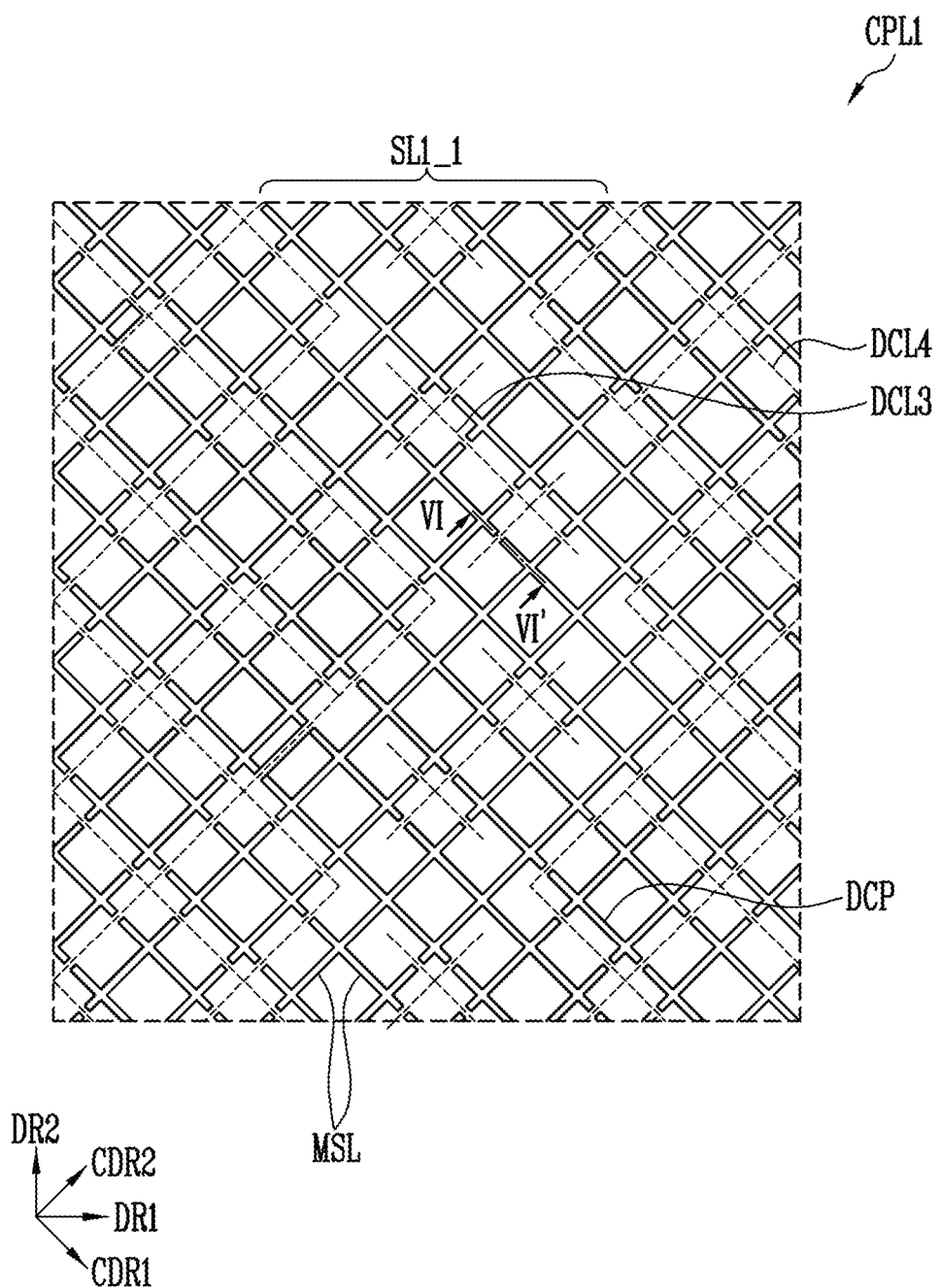
FIG. 22 is an enlarged plan view of an EE area of FIG. 21.

FIG. 21 is an enlarged plan view of the CC area of FIG. 17. In FIG. 21, the first sensing line SL1_1 is briefly shown based on the third and fourth dummy cutting lines DCL3 and DCL4. FIG. 22 is an enlarged plan view of an EE area of FIG. 21. FIG. 22 shows the first conductive layer CPL1. The second conductive layer CPL2 for an embodiment of FIG. 21 may be the same as the second conductive layer CPL2 of FIG. 20. A cross-section along a line VI-VI' of FIG. 22 may be substantially the same as that of FIG. 9.

Referring to FIGS. 18 to 22, except for a shape of the third and fourth dummy cutting lines DCL3 and DCL4, the first conductive layer CPL1 according to an embodiment of FIGS. 21 and 22 may be substantially identical or similar to the first conductive layer CPL1 according to the embodiment shown in FIGS. 18 to 22. Therefore, an overlapping description may not be repeated.

The first sensing line SL1_1 may have a line width corresponding to about two mesh holes in the first direction DR1, and may extend in a zigzag form in the second direction DR2 compared to the first sensing line SL1_1 of FIG. 19. The mesh lines MSL of the first sensing line SL1_1 may include a dummy cutting area cut along the third dummy cutting line DCL3. As shown in FIG. 22, the third dummy cutting line DCL3 may have a shape of "╪". The fourth dummy cutting line DCL4 (particularly, an edge portion of the fourth dummy cutting line DCL4) may have a shape corresponding to a shape of the first sensing line SL1_1 (or the third dummy cutting line DCL3).

Compared to the sensing line SL1_1 of FIG. 19, since the first sensing line SL1_1 of FIGS. 21 and 22 extends in the zigzag form in the second direction DR2 and the dummy cutting area according to the third dummy cutting line DCL3 is arranged more irregularly, the first sensing line SL1_1 (or an edge thereof) may be less visually recognized.

Meanwhile, in a plan view, the third dummy cutting line DCL3 and the second dummy cutting line DCL2 of FIG. 20 may cross each other in some of the mesh hole MH but may not extend along the same direction while overlapping each other, and the dummy cutting area of the first sensing line SL1_1 along the third dummy cutting line DCL3 may not overlap the second cutting area of the first sensor pattern SP1 along the second dummy cutting line DCL2.

Figure 23:
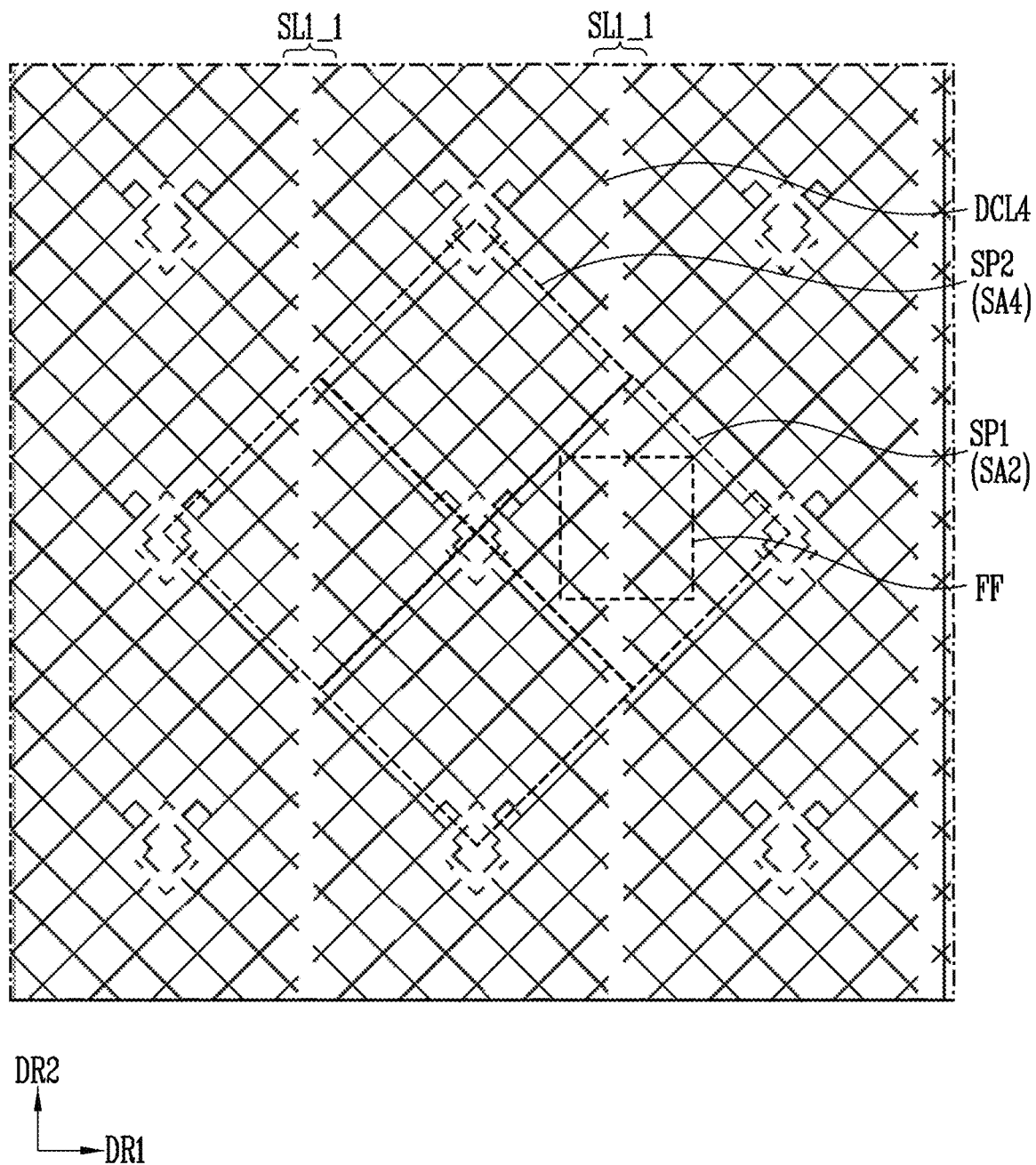
FIG. 23 is an enlarged plan view of the CC area of FIG. 17.
Figure 24:
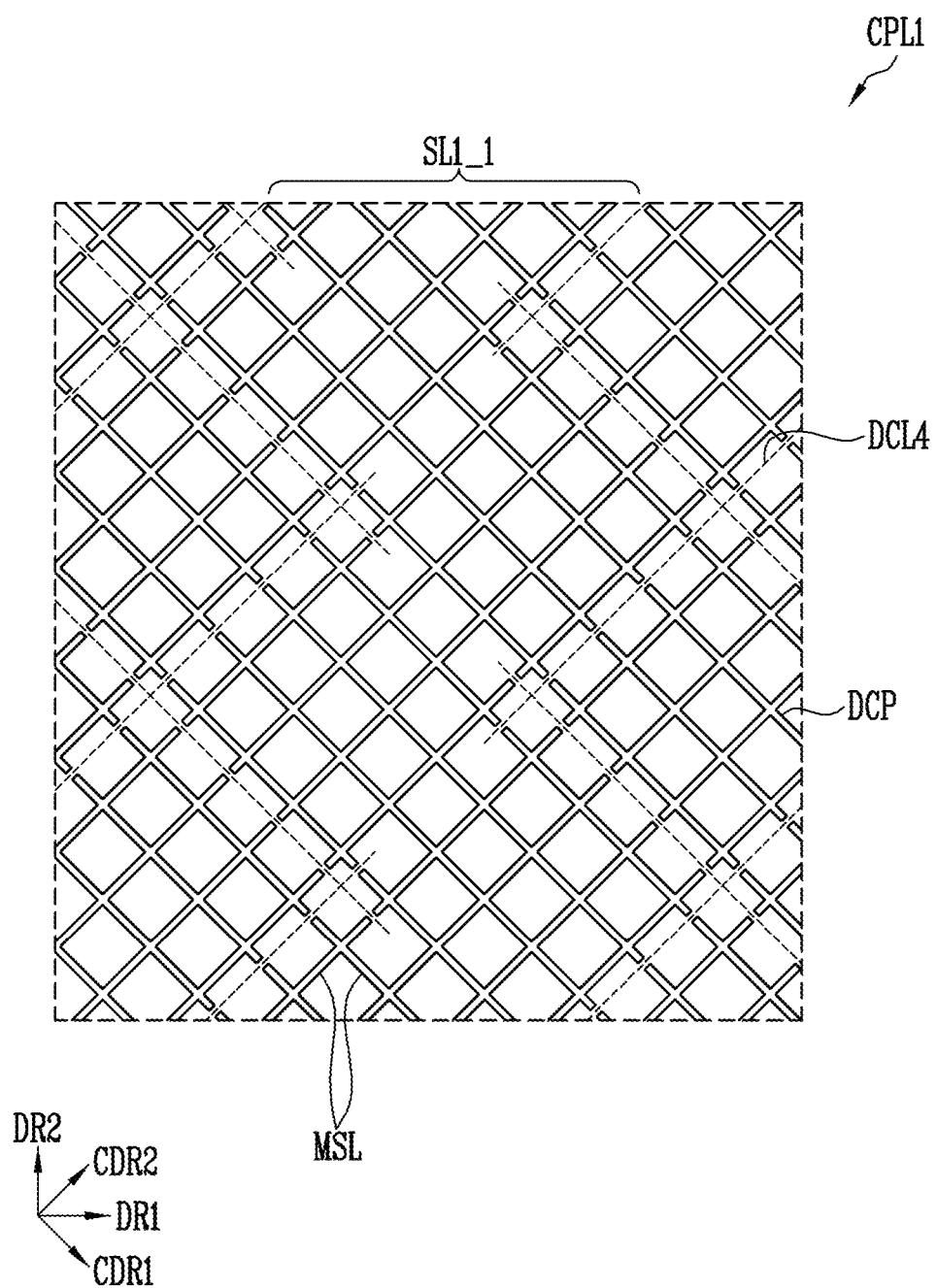
FIG. 24 is an enlarged plan view of an FF area of FIG. 23.

FIG. 23 is an enlarged plan view of the CC area of FIG. 17. In FIG. 23, the first sensing line SL1_1 is briefly shown based on the fourth dummy cutting line DCL4. FIG. 24 is an enlarged plan view of an FF area of FIG. 23. FIG. 23 shows the first conductive layer CPL1. The second conductive layer CPL2 for an embodiment of FIG. 23 may be the same as the second conductive layer CPL2 of FIG. 20.

Referring to FIGS. 18 to 20, 23, and 24, except for the third and fourth dummy cutting lines DCL3 and DCL4, the first conductive layer CPL1 according to an embodiment of FIGS. 23 and 24 may be substantially identical or similar to the first conductive layer CPL1 according to the embodiment of FIGS. 18 to 20. Therefore, an overlapping description may not be repeated.

The first sensing line SL1_1 may have a line width corresponding to about two mesh holes in the first direction DR1, and may extend in a zigzag form in the second direction DR2 compared to the first sensing line SL1_1 of FIG. 19. Meanwhile, the mesh lines MSL of the first sensing line SL1_1 may not include a dummy cutting area. The fourth dummy cutting line DCL4 (particularly, an edge portion of the fourth dummy cutting line DCL4) may have a shape corresponding to a shape of the first sensing line SL1_1 (or the third dummy cutting line DCL3). In addition, a size (or an arrangement distance) of a unit mesh of the fourth dummy cutting line DCL4 may be greater than a size (or an arrangement distance) of a unit mesh of the fourth dummy cutting line DCL4 of FIG. 19. For example, the unit mesh of the dummy cutting line DCL4 of FIG. 19 may correspond to two mesh holes, and the unit mesh of the dummy cutting line DCL4 of FIG. 24 may correspond to four mesh holes. Accordingly, a size of the dummy patterns DCP of FIG. 24 may be greater than that of the dummy patterns DCP of FIG. 19.

That is, the arrangement distance of the dummy cutting line DCL4 may be variously changed. Meanwhile, the third dummy cutting line DCL3 may have an arrangement distance corresponding to the arrangement distance of the dummy cutting line DCL4 so that the first sensing line SL1_1 is not visually recognized. When the arrangement distance of the dummy cutting line DCL4 is increased, the third dummy cutting line DCL3 may not exist, and the first sensing line SL1_1 may not include a dummy cutting area (that is, a dummy cutting area along the third dummy cutting line DCL3).

Figure 25:
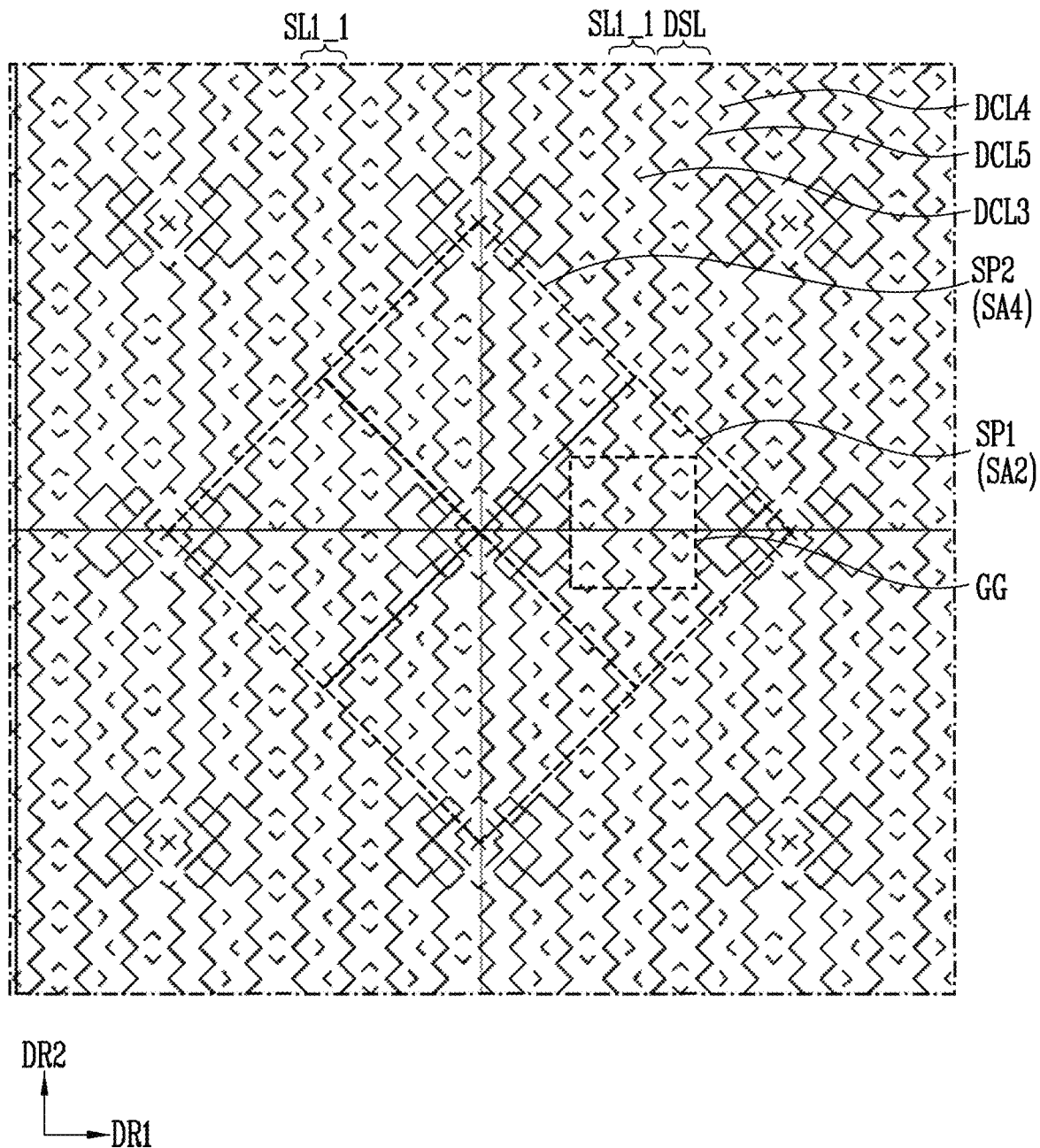
FIG. 25 is an enlarged plan view of the CC area of FIG. 17.
Figure 26:
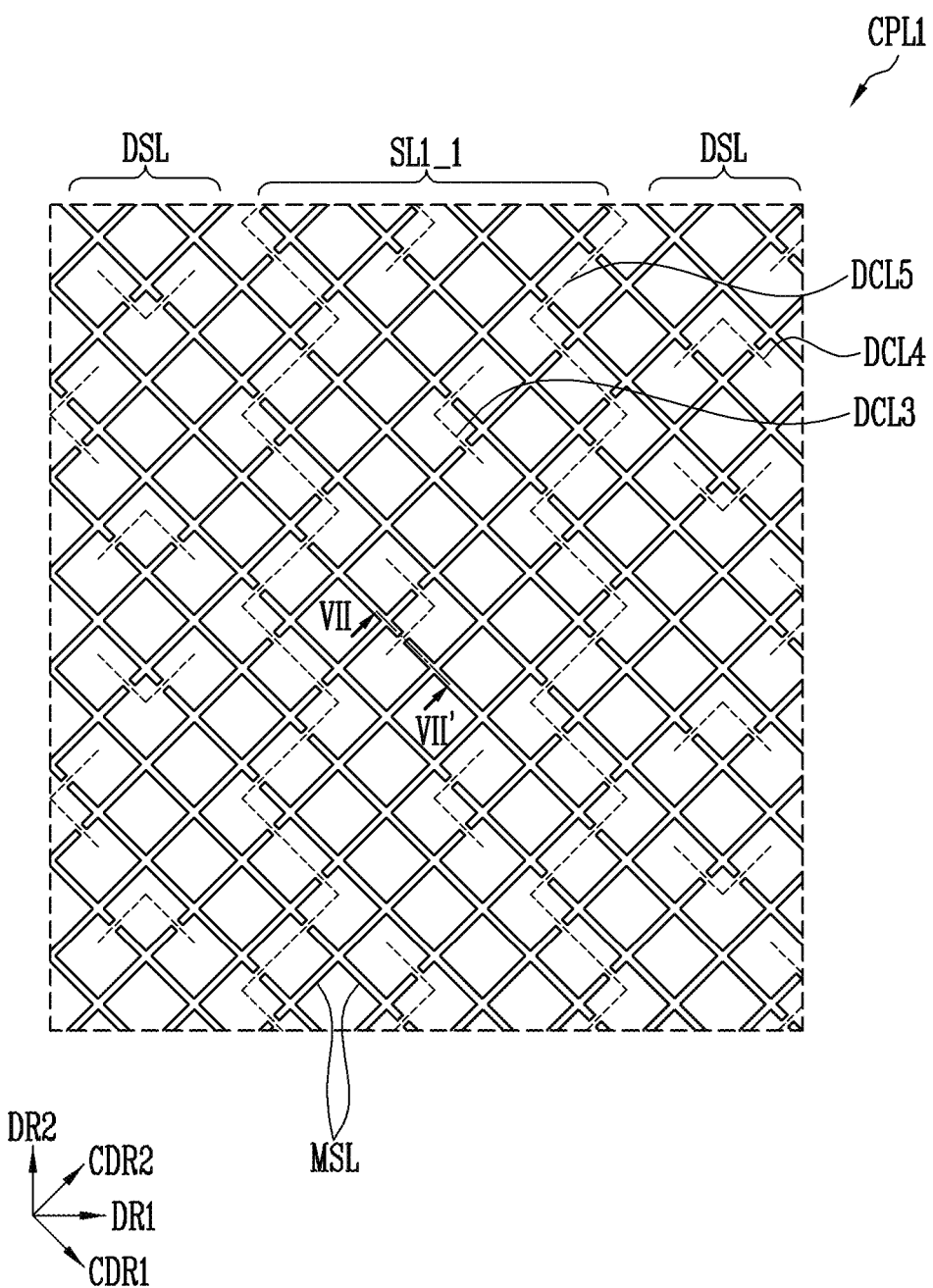
FIG. 26 is an enlarged plan view of a GG area of FIG. 25.

FIG. 25 is an enlarged plan view of the CC area of FIG. 17. In FIG. 25, the first sensing line SL1_1 is briefly shown based on dummy cutting lines DCL3 to DCL5. FIG. 26 is an enlarged plan view of a GG area of FIG. 25. FIG. 25 shows the first conductive layer CPL1. The second conductive layer CPL2 for an embodiment of FIG. 25 may be the same as the second conductive layer CPL2 of FIG. 20. A cross-section along a line VII-VII' of FIG. 26 may be substantially the same as that of FIG. 9.

Referring to FIGS. 18 to 20, 25, and 26, except for a dummy sensing line DSL, the first conductive layer CPL1 according to an embodiment of FIGS. 25 and 26 may be substantially identical or similar to the first conductive layer CPL1 according to the embodiment of FIGS. 18 to 20. Therefore, an overlapping description may not be repeated.

The dummy sensing line DSL (or a dummy line) may be arranged to correspond to the first sensing line SL1_1.

For example, the dummy sensing line DSL may include the mesh lines MSL extending in the first diagonal direction CDR1 and the second diagonal direction CDR2. The dummy sensing line DSL may have a line width corresponding to about two mesh holes in the first direction DR1 and may entirely extend in the second direction DR2. The dummy sensing line DSL may be spaced apart or separated from the first sensing line SL1_1 based on a fifth dummy cutting line DCL5 (or a fifth cutting line). The dummy sensing line DSL may be repeatedly arranged along the first direction DR1.

The dummy sensing line DSL may include a dummy cutting area in which the mesh lines MSL are cut along a fourth dummy cutting line DCL4. The fourth dummy cutting line DCL4 may have a shape corresponding to the third dummy cutting line DCL3. For example, the fourth dummy cutting line DCL4 may have a shape of "∧" or "∨". However, the fourth dummy cutting line DCL4 is not limited thereto, and the fourth dummy cutting line DCL4 may have a shape of "<" or ">". The dummy sensing line DSL may be obtained by connecting a portion of the dummy patterns DCP of FIG. 19.

Since the dummy sensing line DCL corresponding to the first sensing line SL1_1 is repeatedly arranged, the first sensing line SL1_1 and the dummy sensing line DCL may not be distinguished. In addition, since the dummy sensing line DCL also includes a dummy cutting area along the fourth dummy cutting line DCL4, an optical characteristic at an edge of the dummy sensing line DCL and an optical characteristic in a remaining area may become identical or similar to each other, and the dummy sensing line DCL may not be visually recognized.

Meanwhile, in a plan view, the fourth dummy cutting line DCL4 (and the fifth dummy cutting line DCL5) and the second dummy cutting line DCL2 of FIG. 20 may cross each other in some of the mesh hole MH but may not extend along the same direction while overlapping each other in a plan view, cutting areas of the first conductive layer CPL1 along the fourth dummy cutting line DCL4 (and the fifth dummy cutting line DCL5) may not overlap the second cutting area of the first sensor pattern SP1 along the second dummy cutting line DCL2.

Although the disclosure has been described with reference to the preferred embodiment above, those skilled in the art or those having a common knowledge in the art will understand that the disclosure may be variously modified and changed without departing from the spirit and technical area of the disclosure described in the claims which will be described later.

Therefore, the technical scope of the disclosure should not be limited to the contents described in the detailed description of the specification, but should be defined by the claims.

What is claimed is:

1. A display device comprising:
a display panel including a display area where an image is displayed; and
an input sensor disposed on the display panel,
wherein the input sensor comprises:
a first pattern including mesh lines in the display area; and
a second pattern overlapping the first pattern with an insulating layer interposed therebetween and including mesh lines,
wherein the mesh lines of the first pattern include a first mesh line extending in a first reference direction, the mesh lines of the second pattern include a second mesh line extending in the first reference direction and overlapping the first mesh line in a plan view,
wherein, in a plan view, first cutting areas in which the first mesh line is partially cut and second cutting areas in which the second mesh line is partially cut do not overlap each other,
wherein the input sensor further comprises:
a first sensor electrode; and
a second sensor electrode insulated from the first sensor electrode and crossing the first sensor electrode,
wherein the first sensor electrode includes the first pattern and the second pattern,
wherein the second pattern is connected to the first pattern through a contact hole formed through the insulating layer,
wherein the second sensor electrode comprises:
a third pattern including mesh lines, disposed in the same layer as the first pattern, and spaced apart from the first pattern; and
a fourth pattern disposed in the same layer as the second pattern, spaced apart from the second pattern, overlapping the third pattern, connected to the third pattern through a contact hole formed through the insulating layer, and including mesh lines,
wherein the first pattern includes first sensor areas and a first bridge area connecting the first sensor areas,
wherein the second pattern includes second sensor areas overlapping the first sensor areas,
wherein the third pattern includes third sensor areas and a dummy area spaced apart from the third sensor areas,
wherein the fourth pattern includes fourth sensor areas overlapping the third sensor areas, and the first bridge area and a second bridge area connecting the fourth sensor areas and overlapping the dummy area,
wherein a direction in which the first sensor areas are arranged and a direction in which the second sensor areas are arranged are the same,
wherein a direction in which the third sensor areas are arranged and a direction in which the fourth sensor areas are arranged are the same, and
wherein a direction in which the first sensor areas are arranged and a direction in which the third sensor areas are arranged cross each other.

2. The display device according to claim 1, wherein, in a plan view, the centers of the first cutting areas of the first mesh line are spaced apart from the centers of the second cutting areas of the second mesh line by a distance greater than a width of the first and second cutting areas.

3. The display device according to claim 2, wherein, in a plan view, the centers of the first cutting areas of the first mesh line are spaced apart from the centers of the second cutting areas of the second mesh line by a distance of about 2 μm or more.

4. The display device according to claim 1, wherein, in a plan view, the first cutting areas of the first mesh line are positioned along first cutting lines, the second cutting areas of the second mesh line are positioned along second cutting lines, and the first cutting lines and the second cutting lines extending along a same direction do not overlap each other.

5. The display device according to claim 1, wherein a line width of the first mesh line and a line width of the second mesh line are substantially the same.

6. The display device according to claim 1, wherein a line width of the second mesh line is greater than a line width of the first mesh line, and
wherein, in a plan view, the second mesh line substantially covers the first mesh line.

7. The display device according to claim 1, wherein, in a plan view, at least a portion of the first cutting areas and the second cutting areas are positioned at an edge of the first sensor electrode.

8. The display device according to claim 1, wherein, in a plan view, the first cutting areas and the second cutting areas are positioned inside the first sensor electrode and spaced apart from a boundary between the first sensor electrode and the second sensor electrode.

9. The display device according to claim 1, wherein the input sensor is directly disposed on the display panel.

10. The display device according to claim 1, wherein the input sensor further comprises:
a sensor electrode including the second pattern; and
a sensing line including the first pattern and electrically connected to the sensor electrode.

11. The display device according to claim 10, wherein the input sensor further comprises a dummy line disposed in the same layer as the sensing line and including a mesh line overlapping the sensor electrode in a plan view, and
wherein, in a plan view, third cutting areas in which the mesh line of the dummy line is partially cut do not overlap the second cutting areas.

12. The display device according to claim 1, wherein the input sensor further comprises:
a sensor electrode including the second pattern;
a dummy electrode including the first pattern; and
a sensing line disposed in the same layer as the dummy electrode, including mesh lines overlapping the sensor electrode in a plan view, and electrically connected to the sensor electrode.

13. The display device according to claim 12, wherein the mesh lines of the sensing line do not include a cutting area therein.

14. An input sensor comprising:
a first pattern including mesh lines and disposed in a sensor area; and
a second pattern overlapping the first pattern with an insulating layer interposed therebetween and including mesh lines,
wherein the mesh lines of the first pattern include a first mesh line extending in a first reference direction, and the mesh lines of the second pattern include a second mesh line extending in the first reference direction and overlapping the first mesh line,
wherein, in a plan view, first cutting areas in which the first mesh line is partially cut and second cutting areas in which the second mesh line is partially cut do not overlap each other,
wherein the input sensor further comprises:
a first sensor electrode; and
a second sensor electrode insulated from the first sensor electrode and crossing the first sensor electrode,
wherein the first sensor electrode includes the first pattern and the second pattern,
wherein the second pattern is connected to the first pattern through a contact hole formed through the insulating layer,
wherein the second sensor electrode comprises:
a third pattern including mesh lines, disposed in the same layer as the first pattern, and spaced apart from the first pattern; and
a fourth pattern disposed in the same layer as the second pattern, spaced apart from the second pattern, overlapping the third pattern, connected to the third pattern through a contact hole formed through the insulating layer, and including mesh lines,
wherein the first pattern includes first sensor areas and a first bridge area connecting the first sensor areas,
wherein the second pattern includes second sensor areas overlapping the first sensor areas,
wherein the third pattern includes third sensor areas and a dummy area spaced apart from the third sensor areas,
wherein the fourth pattern includes fourth sensor areas overlapping the third sensor areas, and the first bridge area and a second bridge area connecting the fourth sensor areas and overlapping the dummy area,
wherein a direction in which the first sensor areas are arranged and a direction in which the second sensor areas are arranged are the same,
wherein a direction in which the third sensor areas are arranged and a direction in which the fourth sensor areas are arranged are the same, and
wherein a direction in which the first sensor areas are arranged and a direction in which the third sensor areas are arranged cross each other.

15. The input sensor according to claim 14, wherein a line width of the second mesh line is greater than a line width of the first mesh line, and
wherein, in a plan view, the second mesh line substantially covers the first mesh line.

16. The input sensor according to claim 14, further comprising:
a sensor electrode including the second pattern; and
a sensing line including the first pattern and electrically connected to the sensor electrode.

17. An electronic device comprising:
a display panel including a display area where an image is displayed; and
an input sensor disposed on the display panel,
wherein the input sensor comprises:
a first pattern including mesh lines in the display area; and
a second pattern overlapping the first pattern with an insulating layer interposed therebetween and including mesh lines,
wherein the mesh lines of the first pattern include a first mesh line extending in a first reference direction, the mesh lines of the second pattern include a second mesh line extending in the first reference direction and overlapping the first mesh line in a plan view, wherein, in a plan view, first cutting areas in which the first mesh line is partially cut and second cutting areas in which the second mesh line is partially cut do not overlap each other,
wherein the input sensor further comprises:
a first sensor electrode; and
a second sensor electrode insulated from the first sensor electrode and crossing the first sensor electrode,
wherein the first sensor electrode includes the first pattern and the second pattern,
wherein the second pattern is connected to the first pattern through a contact hole formed through the insulating layer,
wherein the second sensor electrode comprises:
a third pattern including mesh lines, disposed in the same layer as the first pattern, and spaced apart from the first pattern; and
a fourth pattern disposed in the same layer as the second pattern, spaced apart from the second pattern, overlapping the third pattern, connected to the third pattern through a contact hole formed through the insulating layer, and including mesh lines, wherein the first pattern includes first sensor areas and a first bridge area connecting the first sensor areas,
wherein the second pattern includes second sensor areas overlapping the first sensor areas,
wherein the third pattern includes third sensor areas and a dummy area spaced apart from the third sensor areas,
wherein the fourth pattern includes fourth sensor areas overlapping the third sensor areas, and the first bridge area and a second bridge area connecting the fourth sensor areas and overlapping the dummy area,
wherein a direction in which the first sensor areas are arranged and a direction in which the second sensor areas are arranged are the same,
wherein a direction in which the third sensor areas are arranged and a direction in which the fourth sensor areas are arranged are the same, and
wherein a direction in which the first sensor areas are arranged and a direction in which the third sensor areas are arranged cross each other.

* * * * *